United States Patent
Russ et al.

(10) Patent No.: US 6,895,591 B1
(45) Date of Patent: May 17, 2005

(54) VIRTUAL FILE SYSTEM AND METHOD

(75) Inventors: Craig F. Russ, Berwyn, PA (US); Steven E. Clarke, Newtown Square, PA (US); James C. Prestifilippo, Lansdale, PA (US); Clark C. Kogen, West Chester, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/420,210

(22) Filed: Oct. 18, 1999

(51) Int. Cl.⁷ .................................................. G06F 3/00
(52) U.S. Cl. ............................ 719/332; 707/10; 710/1; 710/5
(58) Field of Search ....................... 707/1–10; 719/310, 719/319, 328, 331, 332; 710/1, 5

(56) References Cited

U.S. PATENT DOCUMENTS

| | | |
|---|---|---|
| 4,887,204 A | 12/1989 | Johnson et al. |
| 4,891,785 A | 1/1990 | Donohoo |
| 5,235,701 A | 8/1993 | Ohler et al. |
| 5,239,648 A | 8/1993 | Nukui |
| 5,392,400 A | 2/1995 | Berkowitz et al. |
| 5,423,034 A | 6/1995 | Cohen-Levy et al. |
| 5,522,066 A | 5/1996 | Lu |
| 5,537,548 A | 7/1996 | Fin et al. |
| 5,581,761 A | 12/1996 | Radia et al. |
| 5,592,662 A | 1/1997 | Sawada et al. |
| 5,680,559 A | 10/1997 | Chew et al. |
| 5,687,366 A | 11/1997 | Harvey, III et al. |
| 5,704,042 A | 12/1997 | Hester et al. |
| 5,708,832 A | 1/1998 | Inniss et al. |
| 5,721,842 A | 2/1998 | Beasley et al. |
| 5,721,925 A | 2/1998 | Cheng et al. |
| 5,727,155 A | 3/1998 | Dawson |
| 5,745,748 A * | 4/1998 | Ahmad et al. ................. 707/10 |
| 5,748,894 A | 5/1998 | Ishizaki et al. |
| 5,752,005 A * | 5/1998 | Jones ............................ 703/22 |
| 5,764,972 A * | 6/1998 | Crouse et al. ................. 707/1 |
| 5,778,384 A * | 7/1998 | Provino et al. .............. 707/200 |
| 5,799,297 A | 8/1998 | Goodridge et al. |
| 5,805,820 A | 9/1998 | Bellovin et al. |
| 5,838,914 A | 11/1998 | Carleton et al. |
| 5,870,546 A | 2/1999 | Kirsch |
| 5,875,322 A | 2/1999 | House et al. |
| 5,933,820 A | 8/1999 | Beier et al. |

(Continued)

OTHER PUBLICATIONS

Levy, Eliezer et al. "Distributed File Systems: Concepts and Examples." ACM. Dec. 1990.*
Mohy, Mohamed et al. "A DOS/Linux Extensible File System." IEEE. Jun. 1997.*
Sun Microsystems. "JDBC Guide Getting Started." 1997. Chapter 1, pp. 1–12.*
Alexandrov, Albert D. et al. "UFO: A Personal Global File System Based on User–Level Extensions to the Operating Systems." ACM. 1998.*

*Primary Examiner*—Lewis A. Bullock, Jr.
(74) *Attorney, Agent, or Firm*—Woodcock Washburn; Michael B. Atlass; Mark T. Starr

(57) ABSTRACT

A file accessing scheme allows logical files to be processed outside of the native operating system and its logical I/O subsystem. When an application program wants to process a file outside of the native operating system, a file information block is built with a special type of file designated as "virtual." A pointer is provided within the file information block to a handler. The handler is a library that is external to the native operating system. The library processes the file without using the native operating system. Upon completion of the processing, the handler returns the operation results to the file information block and control is transferred back to the application program.

24 Claims, 6 Drawing Sheets

U.S. PATENT DOCUMENTS

| | | | | |
|---|---|---|---|---|
| 6,065,043 A | * | 5/2000 | Domenikos et al. | 709/203 |
| 6,078,929 A | * | 6/2000 | Rao | 707/200 |
| 6,185,574 B1 | * | 2/2001 | Howard et al. | 707/200 |
| 6,356,863 B1 | * | 3/2002 | Sayle | 703/27 |
| 6,356,915 B1 | * | 3/2002 | Chtchetkine et al. | 707/200 |
| 6,363,400 B1 | * | 3/2002 | Chtchetkine et al. | 707/200 |
| 6,519,612 B1 | * | 2/2003 | Howard et al. | 707/200 |
| 2003/0115218 A1 | * | 6/2003 | Bobbitt et al. | 707/200 |

* cited by examiner

VIRTUAL FILE SYSTEM AND METHOD

BACKGROUND OF THE INVENTION

The present invention relates generally to data processing systems and, more particularly, to a file management process.

An operating system (OS) is the software responsible for controlling the allocation and usage of hardware resources such as memory, central processing unit time, disk space, and peripheral devices. The operating system is the foundation on which applications, such as databases, word-processing and spreadsheet programs depend. Popular operating systems include Windows, Windows NT and UNIX.

FIG. 1 shows a schematic block diagram of an exemplary prior art computer system 10, such as a Unisys server running a Master Control Program (MCP) operating system 12. Most operating systems include three (or more) different levels or layers in the I/O subsystem: the logical I/O level 14, the file system/directory level 16, and the physical I/O level 18. At the logical I/O level 14, an application program 20 interacts with the operating system to open, close, read and write files. The file system/directory level 16 handles the location of a given file within the file system, and the physical I/O level 18 level handles interaction with the actual hardware 22 of the computer system, such as a disk drive (not shown).

Many prior art computer systems, such as that illustrated in FIG. 1, support the notion of "file redirection." One example of "redirection" is the manner in which files on different servers in a network are accessed by an application program running on a client computer. When the application program needs to open a file, it makes a standard call to logical I/O requesting that the file be opened. The application program uses the same interface to logical I/O regardless of whether the file exists on the same computer or a different computer across the network. If the file does not reside on the same computer, but rather exists on a different computer across the network, a redirector function at the file system level "redirects" the request to the computer on which the file is stored. See, for example, FIG. 1 wherein redirector 24 accesses remote server 26 via network 28. Conceptually, this process can be referred to as "redirection at the file system/directory level." Redirection can also take place at the physical I/O level where, for example, a device driver might redirect certain file requests to different hardware devices.

FIG. 2 shows a schematic block diagram of the conventional prior art computer system 10 which illustrates the conventional method of file access via the logical I/O subsystem 14 of the Unisys Master Control Program (MCP) OS. When an application program 20 requests to open a file, the logical I/O subsystem 14 builds a file information block (FIB) 30 and provides the application program 20 with a pointer to the FIB 30. The FIB 30 is a container for information or attributes about a given file. For example, for disk files, the FIB 30 contains a pointer to a disk file header 32 for that file which is located in the file system/directory 16. The FIB 30 also contains pointers, or entry points, into routines within the logical I/O 14 that carry out the actual read and write operations on the file. There are different read( ) and write( ) routines within logical I/O 14 for different kinds of files.

Referring again to the disk file example, if, after opening a file, the application program 20 issues a READ request to logical I/O 14, the read( ) routine within logical I/O 14 to which the FIB entry points will execute. Next, that code makes the appropriate calls into the file system/directory 16 and the physical I/O 18 levels to read the requested file from the physical disk drive.

Various deficiencies exist with the conventional file access scheme, including the following deficiencies:

1. Absent additional programming, the system 10 can only access resource types that are supported by the native OS 12. If a different resource type needs to be supported, additional programming code can be written for the OS (including its device drivers), thereby increasing the size, cost and complexity of the OS. Writing and supporting such code may not be cost effective if the resource type is used by only one or a few users.

Alternatively, a hook may be inserted into the logical I/O 14 to gain access to the unsupported resource type. The MCP file subsystem has several implementations wherein logical I/O support has been moved out of the OS 12 and placed in external system libraries. These implementations typically support remote system file access. Keyed I/O and external I/O may also be handled in this manner. Hooks are placed in the logical I/O 14 to get in and out of the system libraries that provide the support for type of file to be processed. The use of hooks adds an additional level of complexity to the file access process.

2. I/O support implemented external to the OS is usually implemented using kernel mode/privileged libraries or device drivers. The programming required by such kernel mode components is often more difficult than application level programming and errors in kernel mode components are potentially destabilizing to the native OS 12.

Accordingly, there is an unmet need for a scheme that allows resource types to be accessed outside of the native OS, without adding code to the native OS, without using custom hooks added to the native OS, and in a manner that protects the stability of the native OS from errors in the code used for resource access. It would also be desirable to provide such a scheme which allows the logical I/O to use conventional I/O features or requests (e.g., OPEN, READ, WRITE, CLOSE) so that no changes have to be made to the logical I/O API used by application programs. The present invention fulfills such needs.

BRIEF SUMMARY OF THE PRESENT INVENTION

The present invention provides a file accessing scheme for use in a data processing system. The data processing system has a native operating system which includes a logical I/O subsystem that interacts with one or more application program files. In the scheme, a file information block is built when an application program opens a specified file. The file information block includes attributes of the specified file. One or more pointers are provided within the file information block (FIB) to routines within the logical I/O that perform operations on the file, and these pointers are adjusted to address OS routines for managing a virtual file. Another pointer in the FIB is directed to a handler control data structure. This structure, like the FIB, includes pointers to routines that perform logical I/O operations on the file, and these pointers are linked to a location external to the native operating system kernel. An I/O handler library is provided at the external location that performs operations on files linked thereto via the handler data structure. The handler returns operation results, file data, or file attributes, as appropriate, to the file information block upon completion of the library operation. When an I/O handler is used, control is transferred from the logical I/O subsystem to routines in the handler while the handler performs the requested file operation.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. However, the present invention is not limited to the precise arrangements and instrumentalities shown. In the drawings.

DETAILED DESCRIPTION OF THE INVENTION

Figure 1:
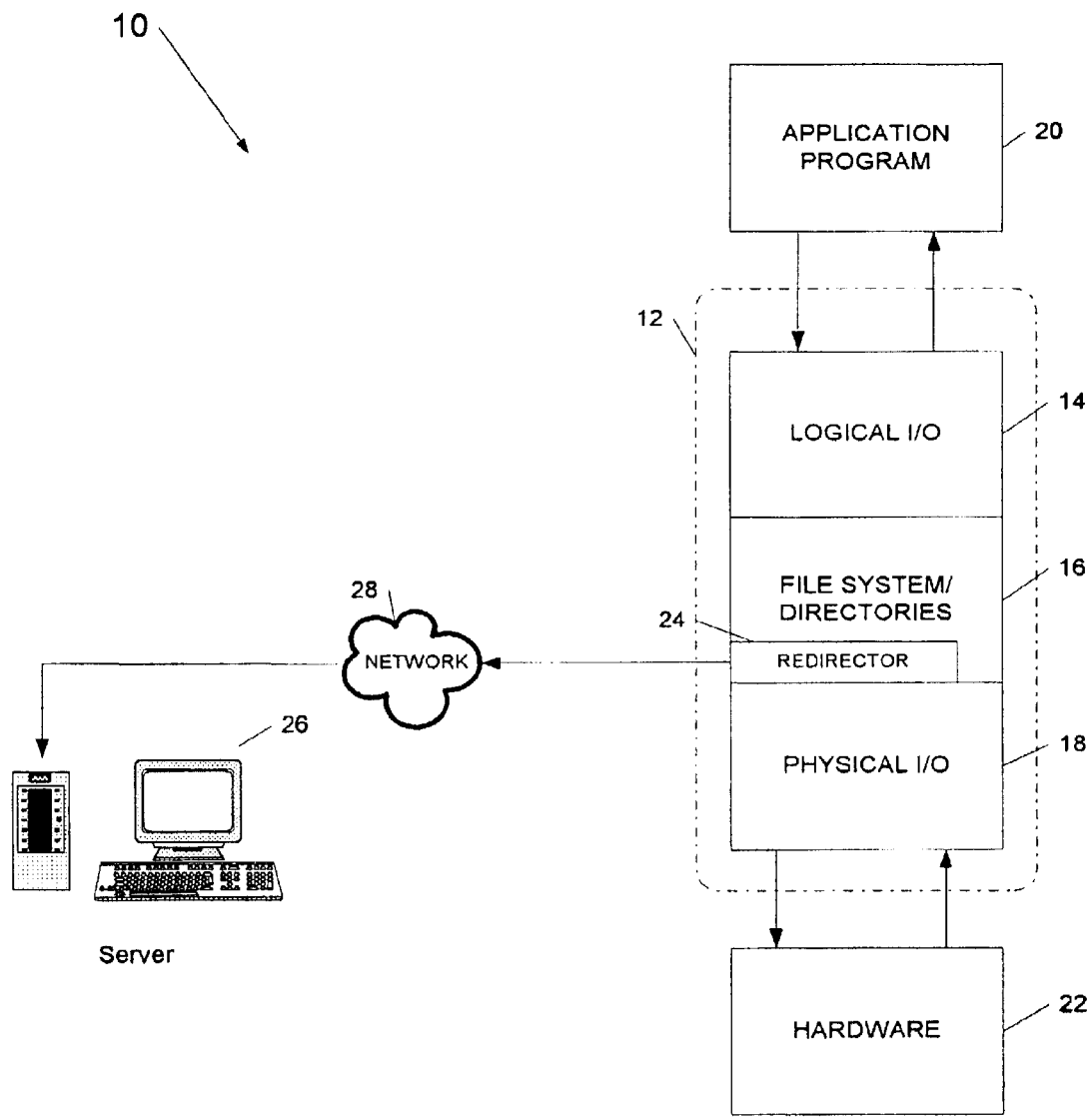
FIG. 1 is a high level schematic block diagram of an exemplary prior art computer system.

Certain terminology is used herein for convenience only and is not to be taken as a limitation on the present invention. In the drawings, the same reference letters are employed for designating the same elements throughout the several figures.

A. Definitions

The following definitions are provided to promote understanding of the invention.

- virtual file—a logical file which is not handled by the native OS. It is a file with characteristics and access methods that are not predefined by the I/O subsystem, but are defined by the application using the file access process described herein. In the embodiment described herein, a virtual file is opened with the attribute specification, KIND=VIRTUAL.
- virtual file mechanism—file access process invoked for processing a virtual file.
- redirector—The software component that issues network file operations on behalf of an application in a Microsoft Networking environment. This component resides on the client side of a client-server configuration.
- handler—a set of routines that manages a virtual file. In the disclosed embodiment of the present invention, the handler is implemented as a library (defined below).
- library—a collection of routines stored in a file. Each set of instructions in a library has a name, and each performs a different, often very specific, task. The present invention uses one or more libraries which are programs that provide services to other programs and which interact with a resource type for which access is requested. An I/O handler is the library that implements a particular virtual file type or set of types. For example, when used in the context of a printer IOHANDLER, it is the library that implements a virtual printer.
- data structure—an organizational scheme, such as a record or any array, applied to data so that it can be interpreted and so that specific operations can be performed upon that data. The present invention uses a handler control data structure referred to as an "I/O Handler Structure Block (IOHSB)." The IOHSB manages communication between the native OS and the handler using the handler control data structure.
- kernel—the core of an operating system. This is the portion of the system that manages memory, files, and peripheral devices; maintains the time and date; launches applications; and allocates system resources.
- file information block (FIB)—a memory structure temporarily assigned or allocated to the application by the OS which holds attributes of a logical file during processing of the logical file. The file information block is an object-oriented structure.

The present invention is described in the context of the Unisys MCP OS which creates file information blocks as described below. The MCP OS FIB contains both methods and data structures for accessing an I/O resource type. Most, if not all, operating systems create memory structures which are equivalent in function to the Unisys MCP OS file information block during execution of application programs, and the scope of the invention includes all such equivalent memory structures.

- resource or resource type—any part of a computer system or a network that can be allocated to a program or a process while it is running.

B. Overview of Present Invention

Figure 2:
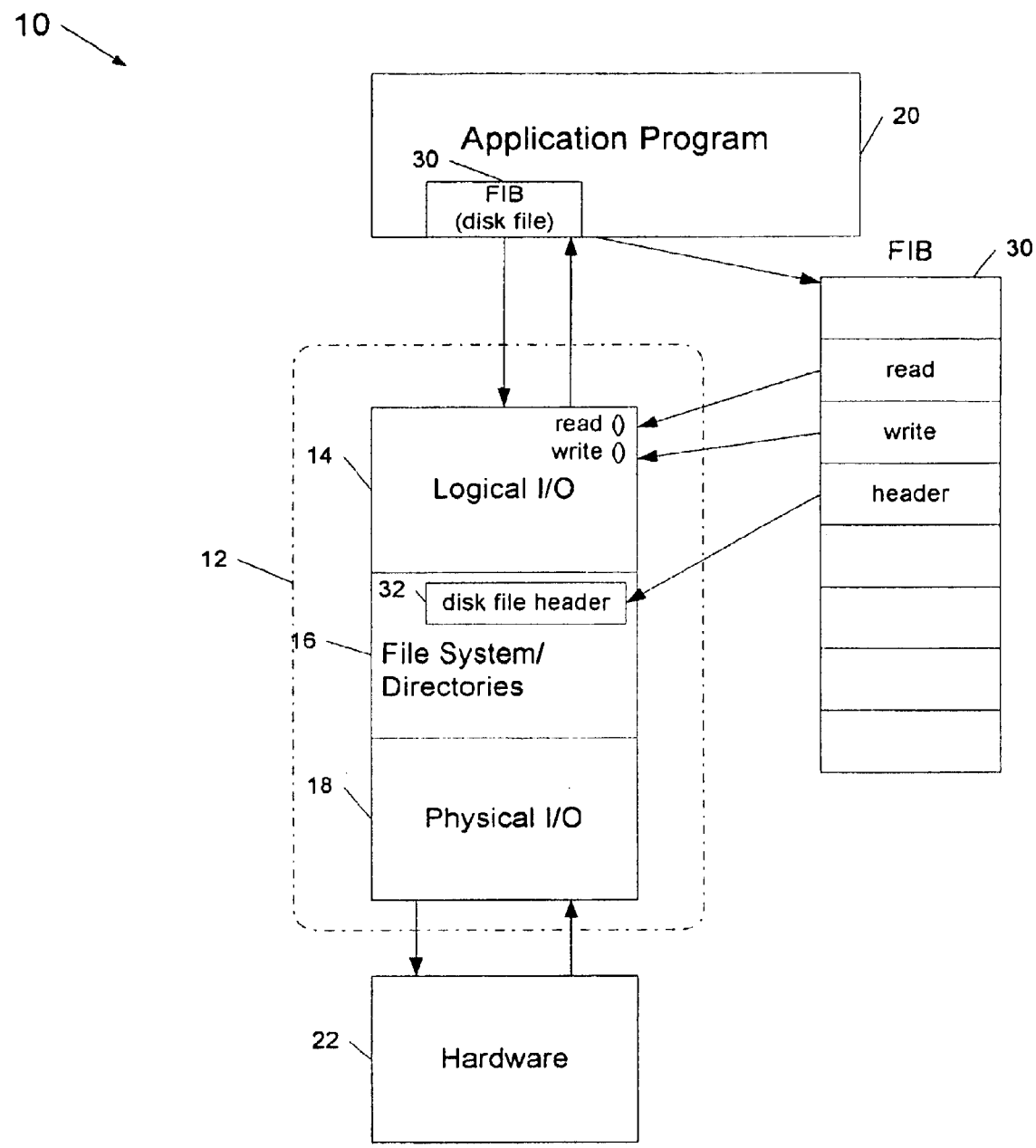
FIG. 2 is a high level schematic block diagram of a file access process of the system in FIG. 1.
Figure 3:
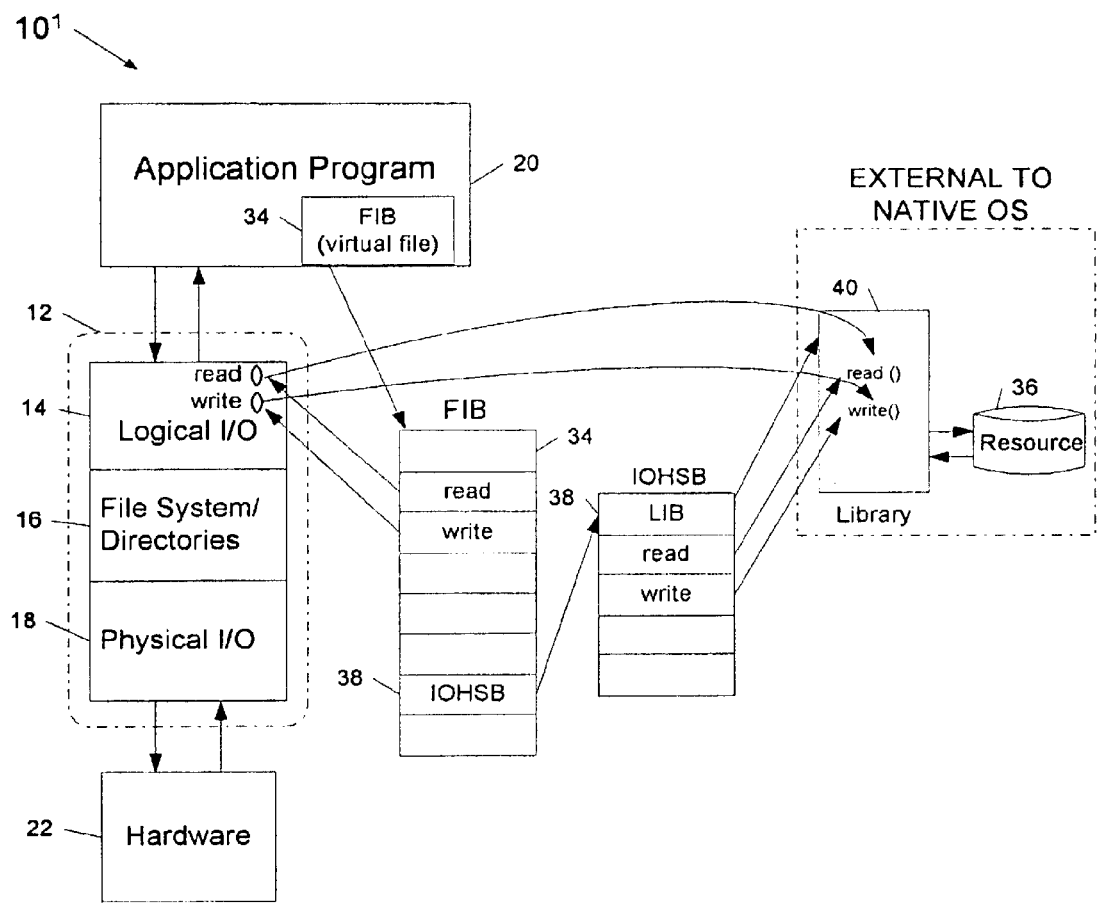
FIG. 3 is a high level schematic block diagram of a file access process in accordance with one embodiment of the present invention.

FIG. 3 is a high level schematic block diagram of a computer system 10' which illustrates a virtual file mechanism in accordance with one embodiment of the present invention. When processing a non-virtual file, the system 10' is similar in physical architecture to the conventional system 10 shown in FIG. 2. However, when processing a virtual file, the system 10' invokes a special type of FIB 34, as described below.

Generally, the present invention is directed to a virtual file mechanism which allows application programs to gain access to resource types which are not supported by the native OS associated with the application program, while still allowing the application programs to use native or conventional I/O language features or requests (e.g., OPEN, READ, WRITE, CLOSE). The present invention may also be used to allow application programs to use alternative resource access methods (different than those supported by the native operating system) for a resource type that is supported by the native OS in any situation where the user does not want to use the native OS. The present invention also allows resource access methods to be supplied by an application library operating in a safe, non-kernel mode that cannot destabilize usage of the other resource types supported by the native OS.

Referring to FIGS. 2 and 3, in the Unisys MCP OS, the invention is implemented as follows:

1. When an application program 20 requests to open a file, the logical I/O 14 builds a FIB 30 in the conventional manner. If the application program 20 needs standard MCP OS access to resource types which are supported by the MCP OS, the FIB 30 operates in the conventional manner to access the resource types.

2. If an application program 20 requests access to a resource 36 which is not supported by the MCP OS 12, or if it requests access to the resource 36 using different methods than are supported by the MCP OS 12, then a FIB 34 is built with an additional pointer to a virtual file data structure, referred to as an I/O Handler Structure Block (IOHSB) 38. Control is passed to the routines of the I/O Handler 38. The I/O Handler 38 includes one or more libraries. One such library 40 is shown in FIG. 3. The programs in the libraries 40 interact with the resource 36 for which access was originally desired. That is, the programs in the libraries 40 provide the implementation of the resource access methods used by the conventional I/O language features. Thus, the libraries 40 contain a customized implementation of the logical I/O intrinsics in the form of custom code for accessing the resource(s). When a library function is completed, control is passed back to the FIB 34 and the application program 20 proceeds in the conventional manner to use data retrieved and/or processed from the resource 36. If desired, plural I/O Handler routines may be daisy-chained together, as discussed in more detail below.

More specifically, when an application program 20 issues a request to OPEN a file of type VIRTUAL, the logical I/O 14 creates a FIB 34 for the file. One of the entries in the FIB 34 is a pointer to a newly created IOHSB 38 for the virtual file. The IOHSB 38 contains a pointer to the external library 40, as well as pointers to the entry points within the external library 40 of the routines that will perform the actual file access operations (e.g., READ, WRITE) on the resource 36. When the application program 20 issues a request, for example, to read from the virtual file, a specialized read( ) routine within the logical I/O 14 will invoke the corresponding entry point of the read( ) routine implemented in the external library 40. That code will execute to perform the read operation on the resource 36, possibly invoking standard capabilities of the OS 12 during this processing. When the virtual file is closed, the IOHSB 38 invokes a close routine and delinkage from the IOHSB library 40 occurs. The logical I/O 14 will then return the requested data to the application program 20. Native logical I/O requests may thus be used to access the virtual file mechanism and bypass the native logical I/O 14 in a manner that is transparent to the application program 20.

Figure 4A:
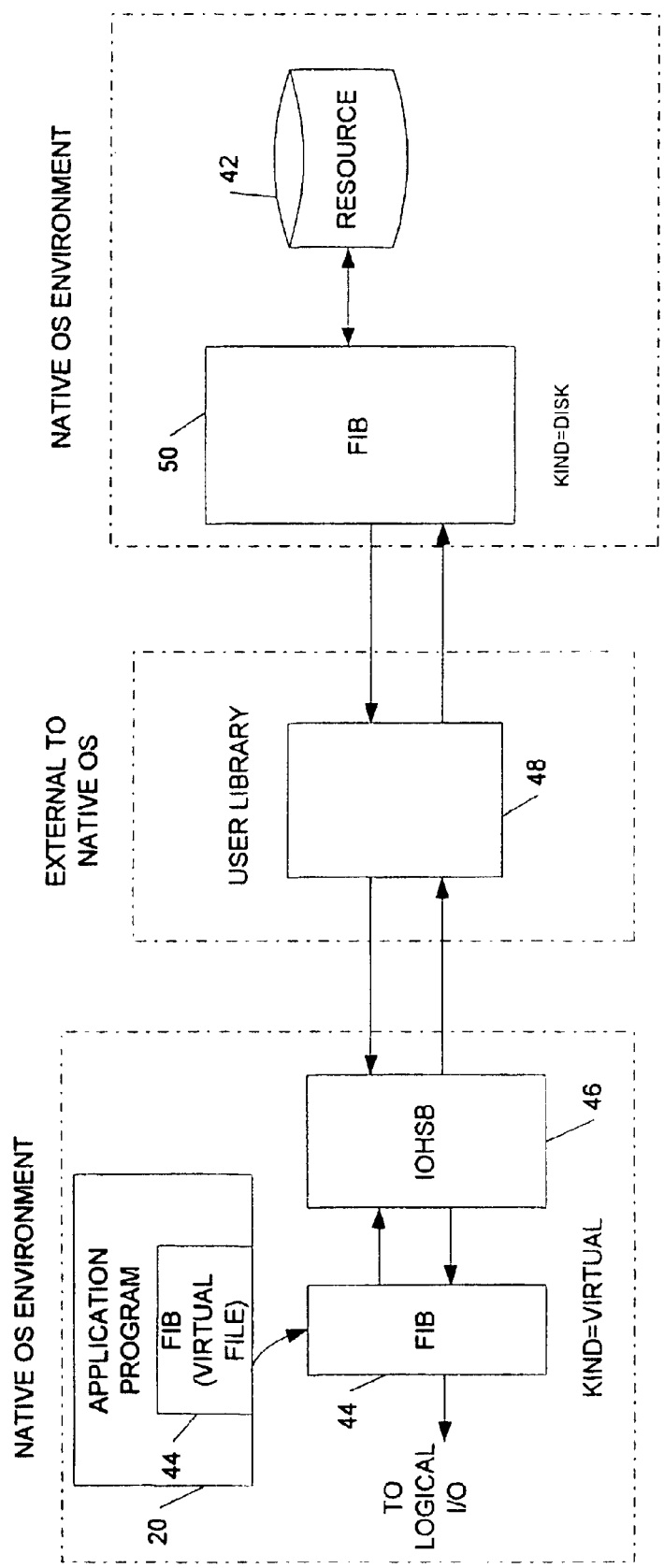
FIGS. 4A, 4B and 4C are high level schematic block diagrams which illustrate how the file access process of the present invention may be daisy-chained with conventional file access processes and with another file access process of the present invention.
Figure 4B:
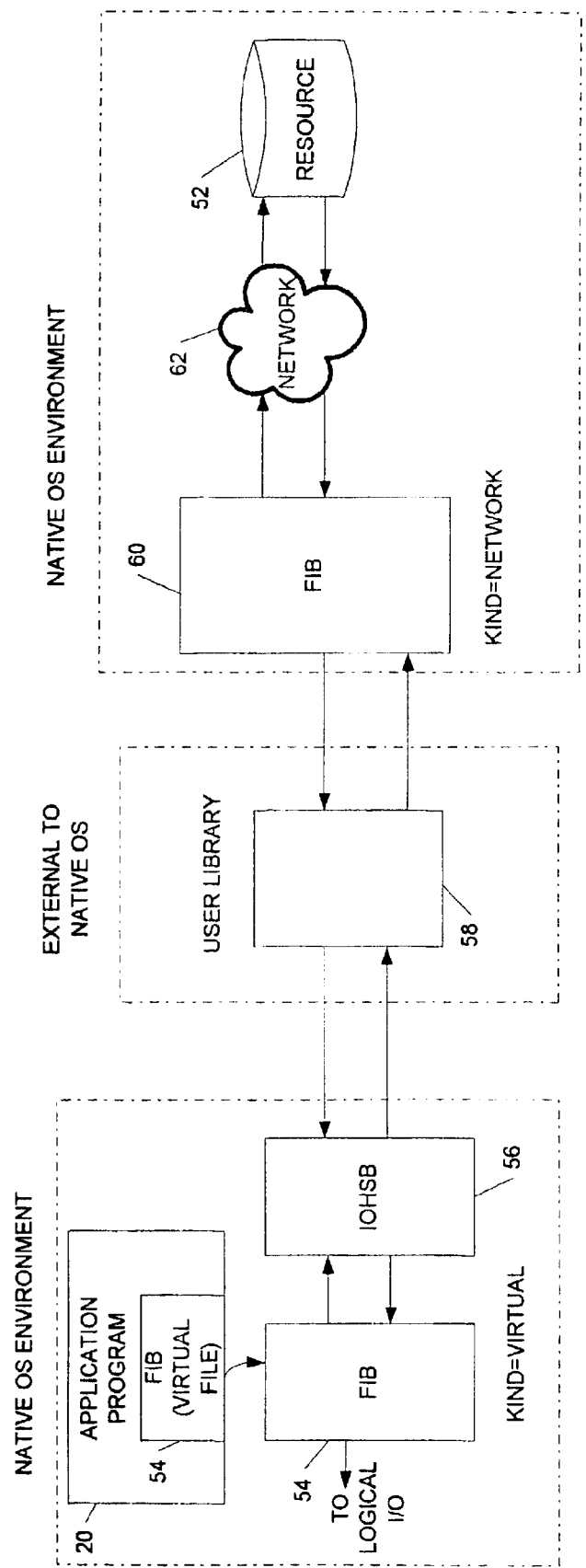
Figure 4C:
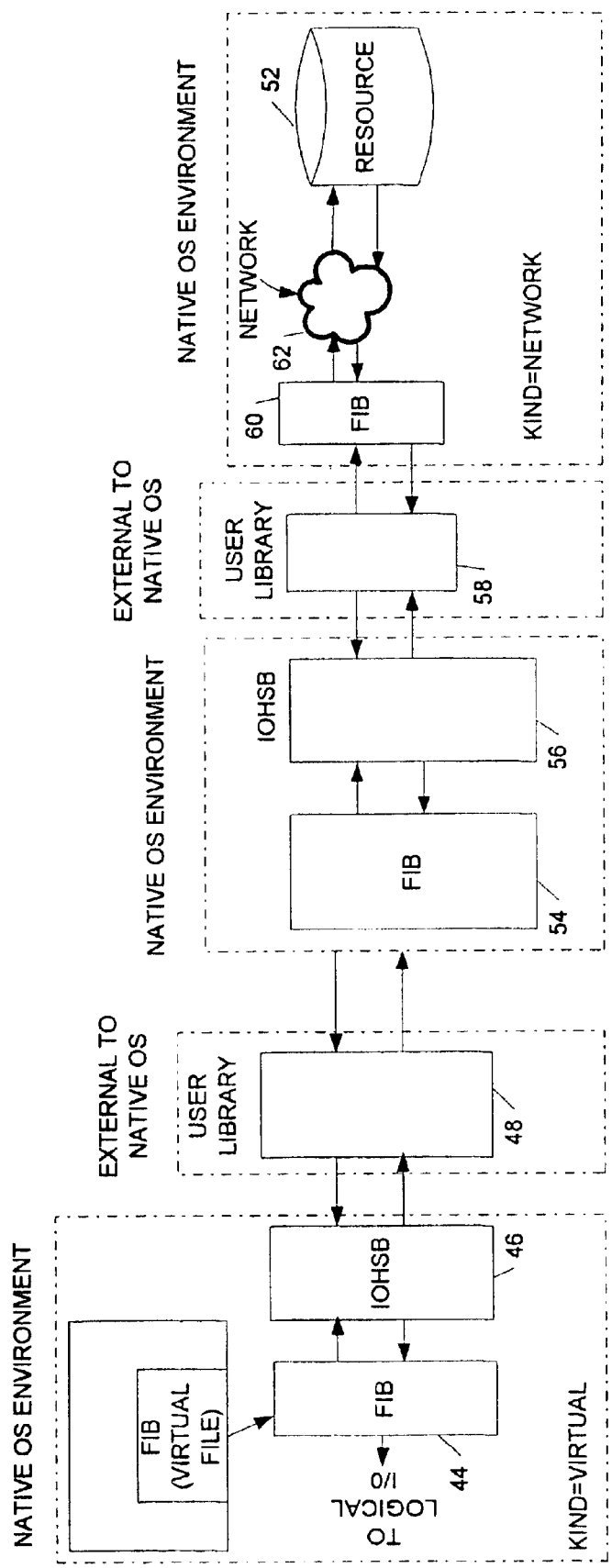

FIGS. 4A–4C show examples of how plural I/O handler routines may be daisy-chained together. To simplify the illustrations, the pointers, the individual FIB contents, and the OS are not shown. However, these details are illustrated in FIG. 3. The examples below show daisy-chained routines of two and three FIBs. However, the scope of the present invention includes any number of daisy-chained routines.

FIG. 4A shows an example wherein an application program 20 needs to use data that is in a local resource 42. However, the data is in the wrong format for use by the application program 20. The native OS does not support the reformatting process, or the user of the application program 20 does not wish to use the native OS to perform the reformatting. Thus, the application program 20 invokes the virtual file mechanism by the designation, KIND= VIRTUAL, which creates FIB 44. The FIB 44 passes control to IOHSB 46, which, in turn, causes initiation of a data reformatting program in external user library 48. The program in the library 48 needs to obtain the input data for reformatting. However, the input data exists in the local resource 42 which is supported by the native OS and which the user would like to access through the native OS. Accordingly, a second, conventional FIB 50 is invoked by the designation, KIND=DISK, which, in turn, causes the data to be retrieved from the locally supported resource 42. After retrieval, the data is passed to the library 48 for data conversion. The converted data is then passed back by the IOHSB 46 and the FIB 44 to the logical I/O (not shown) for subsequent use by the application program 20.

FIG. 4B shows an example wherein an application program 20 needs to use data that is on a remote resource 52. However, the native operating system does not support the logical protocol (e.g., a networking protocol, such as the Microsoft Networking Protocol, known as the Common Internet File System Protocol (CIFS), also known as the Server Message Block Protocol (SMB)) which is needed to retrieve the data, or the user of the application program 20 does not wish to use the native OS to perform the logical protocol. The native OS, however, supports the physical protocol (e.g., TCP/IP) and the user would like to use the native OS for that purpose. The application program 20 invokes the virtual file mechanism by the designation, KIND=VIRTUAL, which creates FIB 54. The FIB 54 passes control to IOHSB 56, which, in turn, initiates the logical protocol program in external user library 58. The program in the library 58 needs to obtain the input data for the logical protocol program. However, as noted above, the input data exists in the remote resource 52 which is supported by the native OS and which the user would like to access through the native OS. Accordingly, a second, conventional FIB 60 is invoked by the designation, KIND=NETWORK, which, in turn, causes the data to be retrieved from the remote resource 52 via network 62. After retrieval, the data is passed to the library 58 for execution of the logical protocol program. The data output by the logical protocol program is then passed back by the IOHSB 56 and the FIB 54 to the logical I/O (not shown) for subsequent use by the application program 20.

The example of FIG. 4B allows a conventional MCP application to gain access to shared files that reside on disk shares in a Microsoft Networking environment using the CIFS protocol. Instead of implementing yet another special network file implementation with its own "hooks" into the logical I/O subsystem, the virtual file mechanism can be used as the foundation and CIFS disk redirection is implemented in a system library as a virtual file.

FIG. 4C shows an example that combines the elements and steps of FIGS. 4A and 4B. In this example, the data required by the application program 20 must be accessed from a remote resource 52 (FIG. 4B example) and reformatted (FIG. 4A example). This example requires three FIBs 44, 54 and 60, two IOHSBs 46, 56, and two external user libraries 48 and 58. These elements function in the same manner as described above.

Libraries may be used for any functions required by the application program 20, whether or not the functions are supported by the native OS. In another example, the application program may wish to implement its own security model using the virtual file mechanism as a layer between the application and the native logical I/O subsystem. In yet other examples, the library may encrypt/decrypt during a read/write operation, or the library may perform an auditing operation. The examples of library functions described herein are merely illustrations of the present invention and are not meant to limit the scope of the invention.

In the present invention, the handler is implemented as a library accessing traditional files containing digital data. However, other implementations are within the scope of the invention, such as an implementation using co-routines or interprocess communication (IPC) conventions between the OS and an application for accessing the files. In addition, it is within the scope of the invention for the handler to implement a protocol to control other objects using the mechanism of logical I/O. An object may be controlled using logical I/O intrinsics, as well as through OS file attribute manipulation. For example, the handler may communicate with a home environment control system, thereby allowing programmatic control from an application written in a native OS programming language.

The handler control data structure (IOHSB 38) is illustrated in FIG. 3 as being a part of the FIB 34. However, the scope of the invention includes embodiments wherein the IOHSB 38 is a separate entity from the FIB 34. Furthermore, the IOHSB 38 and the FIB 34 are shown in FIG. 3 as having pointers to routines for performing operations on the file. However, the scope of the invention includes embodiments wherein these routines are found by any methods consistent with the native OS, including methods which do not use pointers.

In the disclosed embodiment of the present invention, the virtual file mechanism is invoked by a predesignated attribute specification, KIND=VIRTUAL. However, the scope of the invention includes schemes for invoking the virtual file mechanism by other types of predesignated operating system methods. For example, an API may include a statement to change a file to be a virtual file.

C. Detailed Description

Section 1 of the documentation below provides a detailed functional description of one embodiment of the present invention, implemented in the Unisys MCP OS. Section 2 of the document explains how to write a library that can be used as a virtual file handler.

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

---

TABLE OF CONTENTS OF DOCUMENTATION

1 Functional Description
   1.1 Virtual File
      1.1.1 New File Attributes
      1.1.2 IOHANDLER Entry Points
   1.2 IOHANDLER Structure Block
   1.3 BUILDFIB
   1.4 FIBOPEN/OPENVIRTUALFILE
   1.5 SETUPFIB
   1.6 FIBLCOSE
   1.7 SEEK, SPACE, FSYNC and ERASEFILE Support
   1.8 Diagonal Routines
   1.9 Translation
   1.10 Attribute Handling
      1.10.1 IOHANDLER Attribute Handling
      1.10.2 Attribute Restrictions
      1.10.3 Deviations From Disk Attributes
      1.10.4 DEPENDENTSPECS
   1.11 Error Results
      1.11.1 Open/Close Results
      1.11.2 Logical Result Descriptors (LRDs)
      1.11.3 Attribute Results
   1.12 Exception Handling
2 Documentation
   2.1 File Attribute Programming Reference Manual
      2.1.1 General File Attributes
      2.1.2 New OPEN, CLOSE and RESPOND Results
   2.2 I/O Subsystems Programming Guide
      2.2.1 Miscellaneous Additions and Revisions
      2.2.2 Understanding Virtual Files -continued

TABLE OF CONTENTS OF DOCUMENTATION 2.2.2.1 Introduction
      2.2.2.2 Using Virtual Files
         2.2.2.2.1 Programming for Virtual Files
         2.2.2.2.2 ALGOL Example
         2.2.2.2.3 COBOL85 Example
      2.2.2.3 Virtual File IOHANDLER
         2.2.2.3.1 Understanding the IOHANDLER
         2.2.2.3.2 IOHANDLER Entry Points
         2.2.2.3.3 Example IOHANDLER

---

[Beginning of Documentation]

This detailed description of the embodiment of the invention in the MCP includes terms and concepts that are unique to the MCP OS programming environment. Full information about these terms and concepts are contained in The ClearPath HMP and A Series Product Documentation Library CD-ROM (part number 8807 8035-003) for release HMP 4.0/SSR45.1 March 1999, available from Unisys Corporation. The reference manuals, occasionally referred to in the following description, are included in this documentation library.

1. Functional Description

The implementation of Virtual Files within the MCP primarily requires additions and changes to Logical I/O.

1.1 Virtual File Considerations

Using a virtual file requires the use of an IOHANDLER library. This section describes the attributes required to link the virtual file to the IOHANDLER, and the entry points that may be exported from the IOHANDLER and called by Logical I/O in support of virtual file operations.

1.1.1 New File Attributes

The following new file attributes are implemented to support virtual files and have meaning only when KIND=VIRTUAL:

IOHLIBACCESS
   IOHFUNCTIONNAME
   IOHINTERFACENAME
   IOHTITLE
   IOHPREFIX
   IOHLIBPARAMETER
   IOHSTRING

With the exception of the IOHSTRING and IOHPREFIX attributes, the new attributes specify the form of library linkage to be used when linking to the IOHANDLER library as part of opening a virtual file. These attributes provide a comprehensive set of library functionality:

The IOHLIBACCESS attribute is used to specify the form of library access (i.e., BYTITLE, BYFUNCTION, BYINITIATOR).

The IOHFUNCTIONNAME attribute specifies the library function name when library access is BYFUNCTION.

The IOHTITLE attribute specifies the library title when library access is BYTITLE.

The IOHPREFIX and IOHSTRfNG attributes are specific to the IOHANDLER being utilized for the virtual file. That is, the proper value of the IOH_PREFIX and allowable usage of the IOHSTRING is defined by the writer of the IOHANDLER. The function of these two attributes is as follows:

The IOHPREFIX attribute specifies the prefix string to be used when specifying the actual name of the entry points prior to linking to the IOHANDLER library.

The IOHSTRING attribute provides an IPC mechanism between the application using the VIRTUAL file and the IOHANDLER library that can be useful for propagating information in and out of the library.

The following file declarations illustrate how a program might specify a virtual file.

FILE VF1 (KIND=VIRTUAL, IOHLIBACCESS= BYTITLE, IOHLIBTITLE="OBJECT/ MYIOHANDLER.", . . . );

FILE VF2 (KIND=VIRTUAL, IOHLIBACCESS= BYFUNCTION, IOHFUNCTIONNAME= "MYIOHSUPPORT.", . . . );

The intention is to provide a flexible mechanism with respect to the library linkage yet keep it relatively simple and straightforward for the normal cases of using BYTITLE or BYFUNCTION library access.

The default handling for library linkage is applied when linking to the IOHANDLER library as is the case for a typical program that declares a library and links using some or all default values for the library's attributes. The default handling is consistent with a program that makes the following library declaration

LIBRARY IOHANDLER ( . . . );

That is, BYTITLE linkage is used when IOHLIBACCESS is unspecified and the function name or title that is used when IOHFUNCTIONNAME or IOHTITLE is unspecified is the internal name of the library, IOHANDLER.

If IOHPREFIX is unspecified, then the entry points are assumed to have a prefix of "IOH_". For example, the OPEN entry point name is constructed as "IOH_OPEN".

For example, consider the following file declarations.

FILE VF3 (KIND=VIRTUAL);

FILE VF4 (KIND=VIRTUAL, IOHLIBACCESS= BYFUNCTION);

FILE VF5 (KIND=VIRTUAL, IOHPREFIX= "MYDISK.");

For file VF3, library linkage is performed using a library access of BYTITLE and a code file title of IOHANDLER. For file VF4, library linkage is performed using a library access of BYFUNCTION and a function name of IOHANDLER. In either case, the entry point names are the default names described above. For file VF5, library linkage is the same as that of file VF3 except the library entry points are constructed using the prefix MYDISK (e.g., MYDISKOPEN).

1.1.2 IOHANDLER Entry Points

An IOHANDLER library provides entry point interfaces that are linked to the virtual file by Logical I/O to provide support of various file operations. The following table describes the entry point procedure names (with their default IOHPREFIX of "IOH_") and their required or optional presence:

| Entry Point | Language Function | Required |
| --- | --- | --- |
| IOH_OPEN | OPEN, PRESENT, AVAILABLE and RESIDENT functions, as well as implicit open. | Yes |
| IOH_CLOSE | Explicit CLOSE as well as block exit close. | Yes |
| IOH_READ | Serial or Random READ request. | No |
| IOH_WRITE | Serial or Random WRITE request. | No |
| IOH_GETATTRIBUTE | Interrogation of supported Attributes | No |
| IOH_SETATTRIBUTE | Setting supported Attributes | No |
| IOH_ERASEFILE | ALGOL ERASE, and MCP ERASEFILE functions | No |
| IOH_FSYNC | POSIX FSYNC, and MCP FILESYNC functions | No |

These entry points are referred to throughout this document and are presented here for clarity. Their detailed description is provided later in the document.

1.2 IOHANDLER Structure Block

The key to the VIRTUAL file implementation is the IOHANDLER Structure Block (IOHSB). The IOHSB provides the environment for the linkage between the FIB and the IOHANDLER library. A new structure block type description (IOHSBTYPE) is defined within the MCP global environment that defines, among other things, the following items.

1. The LIBRARY declaration for the IOHANDLER library.
2. The library entry points imported from the IOHANDLER library.
3. A file to be used by the IOHANDLER library (if desired).
4. A Multi-Dimensioned array used by the IOHANDLER library (e.g., IOH_STATE and IOH_BUFFER).
5. Cover functions for the library routines that are invoked out of FIBSTACK.

An instance of this structure Block is stored within the FIB for a virtual file. The library declaration and associated entry points provides the linkage between the FIB through the IOHSB instance to the IOHANDLER library. The library and library access is specified by the new logical attributes that are set on the logical file. Although the parameter structure of the imported entry points are fixed and well defined, the actual name of entry points can be augmented with a prefix that also may be specified on the logical file. The file and arrays declared internal to the IOHSB instance are passed into each call into the library and are used as the library sees fit. Basically, these objects are owned by the application but manipulated by the library. This enables the library to be constructed as a "stateless" SHAREDBYALL library in which state can be maintained across calls into the library without having to store the information in the library's environment. This also eliminates any extra locking required by the library as the normal FIB locking provided by Logical I/O is sufficient to synchronize access to this state.

FIBSTACK is updated to declare an instance of this new structure block type. When FIBSTACK is invoked during the initialization of the system, the "untouched" structure block descriptor is stored off and retained in the global environment. The compiler is kind enough to generate the appropriate stack building code for this variable so that no special hand construction of the untouched descriptor is required. BUILDFIB will then store the untouched structure block descriptor at the appropriate offset within the FIB when a FIB is created or reinitialized. Note, in the reinitialization case, care is taken to first deallocate any previous incarnation of the IOHSB instance.

When KIND=VIRTUAL, the IOHSB instance is referenced in the normal fashion (i.e., touched) during the file open process. Minimal changes to memory management and block cleanup are required to "teach" these areas that a structure block may now reside in a FIB in addition to a stack, another structure block or a dope vector.

Normal scoping rules apply for the IOHSB instance. This environment is equivalent to a PROCESSed procedure that declares an instance of a structure block whose type description is declared in the global environment that corresponds to an ancestral task.

1.3 BUILDFIB

BUILDFIB is responsible for storing the untouched structure block descriptor at the appropriate location within the FIB. It will also determine if the FIB being created is a file declared within an IOHSB instance (i.e., the file F declared within the IOHSBTYPE for a particular virtual file). Although there is no restriction that the IOHSB file cannot itself be virtual, file equation will not be applied to the file declared within the IOHSB. This internal file, although owned by the program declaring the original virtual file, is truly hidden to the application and is intended only to be manipulated by the IOHANDLER library.

1.4 FIBOPEN/OPENVIRTUALFILE

During the FIBOPEN process, the IOHSB instance is referenced for the first time. This occurs when the OPENVIRTUALFILE procedure declared within the structure block is invoked. No explicit, special construction of this structure block instance is required as the normal TOUCH handling is able to create the instance. After the structure block is created, control is passed to the OPENVIRTUALFILE procedure. OPENVIRTUALFILE is responsible for establishing the appropriate linkage to the IOHANDLER library using the attributes set on the logical file. Once linked to the IOHANDLER library, the IOHANDLER's open routine is called. Any errors returned via the library or detected by OPENVIRTUALFILE are propagated back to FIBOPEN.

A set of "default" attributes is passed from the logical virtual file to the library. The attributes selected are primarily those normally applicable to basic MCP file system attributes as utilized for DISK, CDROM and TAPE files. This approach was taken to allow existing programs that access MCP files to easily use an IOHANDLER, while still providing generality to the Virtual File implementation. Direct access to the logical virtual file will not be granted to the library. However, for those attributes supported for virtual files, interrogation and assignment are permitted as described later in this document.

The library in turn will return the following information:

| | |
|---|---|
| IOHMODE | The EXTMODE of the library. |
| IOHRECSIZE | The record size (in units of EXTMODE frames). That is, the number of EXTMODE characters per record. |
| IOHMAXXMTRECS | The maximum number of records that can be passed in and out of the library on a single call to its read or write routine. |
| IOHACCESSMASK | A file access mask |
| IOHBLOCKSTRUCTURE | The BLOCKSTRUCTURE of the library (FIXED or EXTERNAL). |

The character mode (IOHMODE), record size (IOHRECSIZE) and maximum number of records (IOHMAXXMTRECS) control the flow of data between the library and Logical I/O. In addition, this information is necessary for handling proper translation between the library's character set and what the program using the virtual file expects (i.e., the logical virtual file's INTMODE).

The IOHRECSIZE and IOHMODE values returned by the library can be thought of as the MAXRECSIZE and EXTMODE of the "physical" file. In addition, the interface between Logical I/O and the IOHANDLER library will be character oriented based upon the IOHMODE character set. That is, the FRAMESIZE of the "physical" file is assumed to be the number of bits in an IOHMODE character. Therefore, the IOHRECSIZE value returned by the IOHANDLER library must always be expressed in units of IOHMODE frames. If DEPENDENTSPECS is not set on the logical virtual file, then the MAXRECSIZE and FRAMESIZE attributes specified on the logical file must be consistent with the IOHRECSIZE and IOHMODE values returned by the library. In other words, the number of bits in the logical record that the program expects must be equal to the number of bits in the logical record that the library expects. If this invariant is not satisfied, then an appropriate open error is returned. This invariant can be described by the following expression:

Virtual file: *MAXRECSIZE*\*Bits per EXTMODE frame=IOHANDLER file: IOHRECSIZE\*Bits per IOHMODE character Note that the Virtual File side of the equation includes the "Bits per EXTMODE frame". This is to account for a difference in the INTMODE and EXTMODE character size of the virtual file, which results in data expansion or contraction during translation. Although translation issues are discussed in greater detail later in this document, the following example illustrates how the requirements of the above formula apply when the INTMODE and EXTMODE of the virtual file differ.

Consider an IOHANDLER library that returns an IOHMODE of EBCDIC and an IOHRECSIZE of 180. This indicates that the library defines a record as 180 8-bit (EBCDIC) characters. The logical virtual file may therefore be declared with any attributes that result in an external record of 180 bytes. For example, the virtual file may specify an INTMODE of HEX and an EXTMODE of EBCDIC, utilizing the HEXTOEBCDIC translate tables. In this case, the MAXRECSIZE of the virtual file must correspond to 180 HEX characters, since the result of the translation of 180 HEX characters to EBCDIC causes data expansion to 180 8-bit characters. The virtual file may therefore either be declared with FRAMESIZE=4 and MAXRECSIZE=180, or FRAMESIZE=48 (12 hex characters per frame) and MAXRECSIZE=15.

If DEPENDENTSPECS is true, then the FRAMESIZE and MAXRECSIZE of the logical virtual file will be set to values consistent with the IOHMODE and IOHRECSIZE values returned by the library. Other attributes will also be assigned default values as described later in this document.

By default, the EXTMODE value of the logical virtual file is set to the IOHMODE value returned from the library as is the case when opening an existing disk file. However, unlike disk files, this is also done when creating a new file (e.g., NEWFILE=TRUE). The OVERRIDEEXTMODE attribute may be used to specify a different EXTMODE provided the character size of this mode matches the IOHMODE returned from the IOHANDLER.

Specific security checking is the responsibility of the IOHANDLER library as Logical I/O has no idea what the virtual file represents. The IOHANDLER library is responsible for returning an access mask (IOHACCESSMASK) back to Logical I/O which specifies the mode of access granted to the program opening the file. The mask indicates if read and/or write permission is granted. Logical I/O in turn will process this access mask and set the appropriate diagonals to ILLEGALCOLUMNACTION when that form of access is not granted. For example, if the library indicates that read is not permitted, then the read random and read serial diagonals will be set to ILLEGALCOLUMNACTION. In addition, the appropriate PCWERRORF flags within the FILEACCESS word is set and processed by ILLEGALCOLUMNACTION as is the case when handling security violations when attempting to open a disk file. This effectively extends the security violation handling and enforcement to the IOHANDLER library as well.

No I/O buffers (i.e., IOMOMs) are allocated for a KIND=VIRTUAL file. Therefore, the BUFFERS attribute will have no meaning and is ignored when a virtual file is opened. However, a single overlayable buffer is allocated in BUFFDESC in order to buffer the reads and writes between the application program and the IOHANDLER library. This is needed to isolate the application program from the IOHANDLER library. For example, a write operation should not cause the contents of the user's array to change either due to translation or due to an errant IOHANDLER library.

The ACTUALPOSITIONATEND interface is supported for KIND=VIRTUAL as is the case for DISK files. This is to give programs the functionality provided with the ATEND open option. This basically positions the current record pointer at the end of the file as part of the open operation.

The PRESENT and AVAILABLE file checks are supported for KIND=VIRTUAL as they are just another way of opening a file. In addition, RESIDENT will be supported so that existing utilities as well as WFL jobs will continue to function properly when file equation is used to specify a virtual file.

The RESIDENT function does not technically open the file from the point of view of the program. As a result, ATTGRAB will invoke FIBOPEN specifying a type value of RESIDENTV as is the case for other KINDs. FIBOPEN will then link to the IOHANDLER library and invoke the library's open routine as it does when opening a virtual file. Following the open, FIBOPEN as part of the "releasing" the file will then invoke the IOHANDLER's close routine. Although this may seem somewhat expensive, it is necessary in order to preserve the semantics of RESIDENT.

1.5 SETUPFIB

SETUPFIB is responsible for setting up the FIB consistent with KIND=VIRTUAL. Specifically, the appropriate diagonal routines must be stored at the appropriate offsets within the FIB. FILEUSE will be handled and the appropriate ILLEGALCOLUMNACTION routines are stored when FILEUSE indicates that a particular mode of access (read or write) is not intended, as is the case for other KINDs.

At minimum, the IOHANDLER library must provide an appropriate IOH_OPEN and IOH_CLOSE entry point in order for a virtual file to be successfully opened. If the library does not provide an IOH_READ routine (or the IOH_READ routine could not be linked properly) then the logical virtual file's READ serial and random PCW locations are set to ILLEGALCOLUMNACTION (as is the case when FILEUSE indicates that read is not permitted). Similarly, if the library does not provide an IOH_WRITE routine (or the IOH_WRITE routine could not be linked properly), the logical virtual file's WRITE serial and random PCW locations are to ILLEGALCOLUMNACTION (as is the case when FILEUSE indicates that write is not permitted). This allows for an IOHANDLER that only supports READ, WRITE or neither READ nor WRITE and Logical I/O will provide the appropriate enforcement through the ILLEGALCOLUMNACTION handling.

An attempt to READ or WRITE to the virtual file when the corresponding entry point is not provided by the library will result in the abnormal termination of the program with a FUNCTION NOT AVAILABLE error.

1.6 FIBCLOSE

When KIND=VIRTUAL, FIBCLOSE will invoke the CLOSEVIRTUALFILE procedure declared within the IOHSB. CLOSEVIRTUALFILE will invoke the library's close routine passing in an appropriate DISPOSITION and ASSOCIATION. Any errors returned by the library or detected by CLOSEVIRTUALFILE is propagated back to FIBCLOSE. After returning back from the library's close routine, control is passed back to FIBCLOSE who then deallocates the IOSHB instance. Normal BLOCKCLEANUP of the structure block will cause all internal structures to be deallocated as well as delinkage from the IOHANDLER library.

CLOSE with retain is supported. When a program closes a file with retain (e.g., CLOSE (VF, *)), Logical I/O will simply deallocate the buffer maintained at IOBUFFDESC and will transition the state of the FIB. In addition, RECORDCOUNT is reset. The IOHANDLER's close routine will not be called nor will the library be delinked. If the library provides an appropriate fsync entry point (as described below), it is called to perform any flush action. This is consistent with a retained CLOSE on a disk file.

1.7 SEEK, SPACE, FSYNC and ERASEFILE Support

The SEEK and SPACE functions will be supported and will simply adjust the current record pointer stored in the FIB associated with the logical virtual file to the value specified on the call. An appropriate error is returned when attempting to SPACE beyond the current EOF.

The FSYNC and POSIX_FSYNC intrinsics are supported provided that the IOHANDLER exports the appropriate fsync routine. When a program invokes either the FSYNC or POSIX_FSYNC routines for a virtual file, Logical I/O will attempt to invoke the fsync routine imported from the IOHANDLER library. If no such interface is valid, then the call simply fails quietly and no error is generated. Since these interfaces are intended to allow a program to flush the buffers associated with the logical file, generating an error when the IOHANDLER does not provide the entry point seems a bit harsh. It is the IOHANDLER's responsibility to act on the FSYNC action and perform any buffer flushing that is appropriate.

The ALGOL ERASE (or ERASEFILE) is supported for virtual files. When a program invokes the ERASE intrinsic, Logical I/O will attempt to invoke the erase routine imported from the IOHANDLER library. If no such interface is valid, then an appropriate error is generated.

1.8 Diagonal Routines

New FIB diagonal routines are implemented in order to support the KIND=VIRTUAL file. The main responsibility of the diagonal routines will be to interface with the IOHANDLER library's read and write routines and to maintain the appropriate FIB state required by Logical I/O.

The interface between Logical I/O (i.e., the FIB diagonals) and the library's read/write routine will always be random oriented. That is, the library's entry point will always expect a record offset and a length. The diagonal routines will convert any serial access into an appropriate random access based upon current record pointer. This, of course, is transparent to both the library and the program. However, Logical I/O will pass an indication to the library of whether or not the particular file access operation (read or write) is serial. This information is advisory only and can be used by the library as it sees fit.

In addition, the interface between the diagonals and the library is character oriented and will assume a FRAMESIZE consistent with the EXTMODE character set. This means that the library's interface will ALWAYS expect a length expressed in EXTMODE characters. Logical I/O is responsible for converting read or write requests appropriately when the FRAMESIZE of the logical virtual file is not equal to the EXTMODE frame size. This can occur when the number of bits in the INTMODE character of the logical virtual file differs from the number of bits in the EXTMODE character or if the logical virtual file specifies UNITS other than CHARACTERS.

For example, if the FRAMESIZE of the logical file is 48 (i.e., UNITS=WORDS) then the length passed into the library by Logical I/O must be adjusted to characters and the result returned by the library after a successful read or write operation must be converted back to words. This conversion will be done transparent to the library and the program that has opened the virtual file.

As part of the file open process, Logical I/O will ensure that the library's interpretation of logical record size is the same as the program's interpretation of logical record size. However, the program may be interpreting records in units of words but the library is interpreting records in units of characters. It is the library's responsibility to interpret the record offset and length passed into the read and write routines consistent with its returned IOHRECSIZE value and IOHMODE. Logical I/O is responsible for converting the record offsets and lengths specified on the logical virtual file read or write to a record offset and length consistent with the EXTMODE character set. After every READ or WRITE operation, the diagonal routines will always update the FIB state of the logical virtual file consistent with its specified MAXRECSIZE value.

Although FILESTRUCTURE is always assumed to be STREAM, BLOCKSTRUCTURE of both FIXED and EXTERNAL are supported. It is the IOHANDLER's responsibility to return the proper BLOCKSTRUCTURE value as part of the open. Any value other than FIXED or EXTERNAL that is returned by the library will result in an open error. The primary difference between FIXED and EXTERNAL is how requests that do not fall on a multiple of the specified MAXRECSIZE are handled.

For BLOCKSTRUCTURE=FIXED, all requests to the library are rounded up to the nearest record boundary. For a read operation, the length passed to the library is rounded up to the nearest record boundary and only the amount actually requested by the program is transferred into the users buffer on return from the library's read routine. For a write operation, the write request is padded with nulls to the end of the record and the request length adjusted to the record boundary before calling the library's write routine. The length returned in the LRD will always be adjusted to a record boundary.

For BLOCKSTRUCTURE=EXTERNAL, requests are not rounded up to the specified MAXRECSIZE and the request made to the library (read or write) will match the length specified by the program. In addition, the length returned in the LRD will NOT be adjusted to a record boundary and will match the actual requested length. However, the record pointer in the FIB is always adjusted to the next record consistent with MAXRECSIZE. Note, MINRECSIZE is ignored and is assumed to be zero. ANYSIZEIO is supported for virtual files and is consistent with disk files. If BLOCKSTRUCTURE is EXTERNAL, any attempt to open a virtual file with ANYSIZEIO=TRUE will result in an open error. When ADAPTABLE is specified, the open will succeed and ANYSIZEIO is reset as is the case for disk files. If BLOCKSTRUCTURE is FIXED, then ANYSIZEIO is permitted. When ANYSIZEIO is false, any requests (read or write) that exceed MAXRECSIZE are truncated to MAXRECSIZE. That is, only one record at a time may be processed in a single read or write request. Any requests that fall below MAXRECSIZE are handled as described above for BLOCKSTRUCTURE=FIXED. When ANYSIZEIO is true, multiple records may be processed on a single read or write. When the request does not fall on a record boundary, the last record is handled in the same fashion as when ANYSIZEIO is false.

When ANYSIZEIO is false, the FIB buffer maintained at BUFFDESC is sized to MAXRECSIZE as only one record at a time can be processed. When ANYSIZEIO is true, the buffer is sized based upon the maximum transmit value returned by the library. Any requests that exceed the buffer size (for ANYSIZEIO) are spooled in by Logical I/O and handled in chunks.

The library, in addition to returning error indications such as EOF, will return the length of the completed I/O operation. For a write operation, Logical I/O will return a data error to the program if a good result is returned by the library but the length returned by the library's write routine does not match the requested length. For a read operation, Logical I/O will return a data error to the program if a good result is returned by the library but the length returned by library exceeds the requested length. If the length returned by the library is less than the requested length, no exception is generated. However a short block result is returned to the program.

The diagonal routines will be responsible for handling faults accessing the user supplied buffers. The intention is to handle this in the same manner as any other diagonal routine. Specifically, the interrupt handling (i.e., the logic in the interrupt procedures) for destination and source boundary interrupts will handle these new diagonals as well as the existing diagonals. When a destination boundary interrupt occurs in a "read" diagonal, then the interrupt is effectively masked and the read is truncated. If a source boundary interrupt occurs in a "write" diagonal, then the interrupt is masked and the write is padded up to the requested length.

Logical I/O will also provide appropriate "pacing" when a read or write request exceeds the library's maximum record transfer. When this occurs, the diagonal routine will convert the single request into multiple calls into the library. This is done transparent to the program invoking the READ or WRITE intrinsic. In addition, the first time that pacing is needed, the Logical I/O buffer is resized to the MAX_OVERLAY_SEGMENT.

1.9 Translation

A critical function performed by the diagonal routines is the handling of character set translation based upon the INTMODE, EXTMODE, DEPENDENTINTMODE, OVERRIDEEXTMODE and TRANSLATE attributes specified on the logical virtual file as well as the IOHMODE value returned by the IOHANDLER library during the file open process.

Logical I/O will provide the appropriate translation when possible or generate the appropriate open error when such a translation based upon these attributes is not possible. For example, if the INTMODE attribute of the logical virtual file is EBCDIC and the IOHMODE value returned by the library is ASCII, then the read and write diagonals will provide ASCIITOEBCDIC and EBCDICTOASCII translation when a READ and WRITE operation is performed, respectively.

When OVERRIDEEXTMODE is not specified on the logical file (e.g., OVERRIDEEXTMODE=VALUE (NEVER)), then the EXTMODE of the logical file is set to the IOHMODE returned by the library during the file open process. This is done independent of NEWFILE or DEPENDENTSPECS.

The OVERIDEEXTMODE attribute can be used to override the EXTMODE value returned by the library as is the case when opening an existing disk file. When OVERRIDEEXTMODE is specified to a value other than NEVER, Logical I/O will attempt to use the EXTMODE specified on the logical file as appropriate for the OVERRIDEEXTMODE value. Logical I/O will verify that the size of the logical file's EXTMODE character is the same as the library's IOHMODE character.

When DEPENDENTINTMODE is specified as TRUE on the logical file, the INTMODE attribute of the logical file is set to the logical file EXTMODE after applying the IOHMODE value returned by the library and considering an OVERRIDEEXTMODE specification. When DEPENDENTINTMODE is used in this manner, no translation is performed, since INTMODE=EXTMODE. The intention of the virtual file implementation is to provide the translation semantics based upon the logical file INTMODE and EXTMODE attributes as currently provided for disk files. As such, all translation currently supported by Logical I/O utilizing the native MCP routines, CENTRALSUPPORT entry points or user provided translate tables will be supported for virtual files.

1.10 Attribute Handling

The handling of file attributes for VIRTUAL files follows the same model as for any other file KIND. When the file is UNASSIGNED, attributes are set and read from the LEB or other structures in the FIB. Once the file is opened and becomes associated with a particular KIND, specific action based on KIND is provided by the MCP. Logically, virtual file attribute handling follows the same pattern as DISK file attribute handling. The main departure from DISK files is the lack of a disk file header. For attributes that are meaningful to virtual files, the disk file header structure is logically replaced by either the IOHSB Structure Block instance in the FIB, or by attribute entry points in the IOHANDLER library. All remaining attributes are not considered meaningful for virtual files. These attributes are generally handled as for nonspecific (i.e. not DISK or TAPE) files: the attribute is returned or set as if the file was not assigned or an error is generated.

1.10.1 IOHANDLER Attribute Handling

The attributes of interest for this document are those attributes that are supported using the IOHANDLER entry points. These attributes are listed below, along with a description of the IOHANDLER entry points.

FILENAME (and related LFILENAME, TITLE, LTITLE and PATHNAME)
    FILEKIND
    ALTERDATE
    ALTERTIME
    CREATIONDATE
    CREATIONTIME
    ACCESSDATE
    ACCESSTIME
    SECURITYTYPE
    SECURITYUSE
    SECURITYMODE (and all related sub attributes)
    GROUP
    ALTERNATEGROUPS
    SECURITYGUARD
    OWNER
    IOHSTRING
    USERINFO
    NOTE
    SYNCHRONIZE
    LASTRECORD
    FILESIZE
    CCSVERSION
    EXTDELIMITER For attributes supported for an assigned KIND=VIRTUAL file, the IOHANDLER library is responsible for returning an appropriate value when the attribute is interrogated and for processing the attribute value when the attribute is assigned. Interfaces must be exported by the IOHANDLER that is invoked by Logical I/O when an attribute is assigned or interrogated. Logical I/O will verify that the attribute value that is passed in during assignment and returned by the library during interrogation is consistent with its defined type and range. An appropriate error is generated when the attribute value is not within its defined range of values.

IOH_GETATTRIBUTE and IOH_SETATTRIBUTE must be provided by the IOHANDLER library if it wishes to support interrogation and assignment of the supported file attributes. When a supported attribute is interrogated by the program, Logical I/O (e.g., ATTGRAB) will simply invoke the library's IOH_GETATTRIBUTE routine. Upon return, it will verify the returned value before returning back to the user program. If the entry point is not provided by the library, an appropriate error is generated. Assignment proceeds in much the same way using the IOH_SETATTRIBUTE routine.

For attributes that are not supported for KIND=VIRTUAL files, an appropriate ACTION INCOMPATIBLE WITH KIND error is generated.

The IOHSTRING attribute is supported to enable the program to pass any information to the library and/or extract any information from the library while the file is opened. This can be useful as an IPC mechanism or to pass other "attribute" information that is not formally supported for KIND=VIRTUAL files.

1.10.2 Attribute Restrictions

When KIND=VIRTUAL, FILESTRUCTURE is assumed to be STREAM. Setting FILESTRUCTURE to any other value is simply ignored. In addition, the following restrictions apply to virtual files:

BLOCKSTRUCTURE=FIXED or EXTERNAL
    FILEORGANIZATION=NOTRESTRICTED
    FILETYPE=7 or 8 is disallowed.
    FRAMESIZE and MAXRECSIZE of the logical virtual file must produce a logical record size that matches the logical record size as specified by the Library's IOHRECSIZE and a IOHMODE character size.
    If BLOCKSTRUCTURE is not set, then FILETYPE must be 0 (FIXED) or 3 (EXTERNAL).

1.10.3 Deviations From Disk Attributes

MINRECSIZE is ignored for virtual files. It is not considered when setting a default BLOCKSTRUCTURE. It is also not checked for BLOCKSTRUCTURE=EXTERNAL to produce a DATAERROR result from the MCP.

If NEWFILE is specified, the EXTMODE of the logical file is set to the IOHMODE of the library (in the absence of OVERRIDEEXTMODE).

If NEWFILE is specified, OVERRIDEEXTMODE is examined. This may cause the virtual file EXTMODE to override the IOHMODE.

1.10.4 DEPENDENTSPECS

As with DISK files, DEPENDENTSPECS is ignored when creating a file. When opening existing files, the DEPENDENTSPECS attribute causes the attributes of the virtual file to be set as follows:
1. BLOCKSTRUCTURE is set to the value returned by the library.
2. FILESTRUCTURE is set to STREAM.
3. FRAMESIZE is set to the FRAMESIZE consistent with the INTMODE of the file.
4. MAXRECSIZE is set to the value compatible with the MAXRECSIZE value returned by library but expressed in units compatible with the logical file's FRAMESIZE.
5. UNITS is set based upon the logical file's INTMODE. If INTMODE is SINGLE, then UNITS is set to WORDS otherwise it is set to CHARACTERS.
6. MINRECSIZE is set to MAXRECSIZE if BLOCKSTRUCTURE is FIXED and 0 otherwise.
7. FILETYPE is set to 0 for BLOCKSTRUCTURE=FIXED or 3 for BLOCKSTRUCTURE=EXTERNAL 1.11 Error Results The IOHANDLER is responsible for returning appropriate results from its entry points. These results will ultimately be propagated back to the application using the virtual file.

1.11.1 Open/Close Results

IOH_OPEN and IOH_CLOSE are expected to return OPEN, CLOSE, and RESPOND results as documented in Appendix E of the File Attributes Programming Reference Manual. Logical I/O will convert these results internally using the AVAILABLE_TO_WHICH_CORRESPONDENCE interface. Prior to returning control back to the caller, the error result is mapped back to the appropriate external value. This will ensure that both the user application and the IOHANDLER use the externally defined error values and that Logical I/O continues to use the internal representation. In addition, any newly defined error results will immediately become available for use by an IOHANDLER.

An IOHANDLER could easily return results simply by using the appropriate mnemonics as defined in ATTABLEGEN. For example, IOH_OPEN :=VALUE (OKRSLT); or

IOH_OPEN :=VALUE (NOFILEFOUNDRSLT);

1.11.2 Logical Result Descriptors (LRDs)

IOH_READ, IOH_WRITE, IOH_FSYNC and IOH_ERASEFILE are to return I/O Result Enumerated Values as documented in Appendix F of the File Attributes Programming Reference Manual. Logical I/O will convert these mnemonic values to their appropriate internal form using the ADD_RESULT interface. Ultimately these results are converted back to their external form when they are propagated back to the program using the virtual file. The ADD_RESULT interface will ensure that the FIB is updated properly with the result so that it may be returned properly as part of interrogating the STATE attribute. As is the case for the OPEN/CLOSE results, this ensures that the IOHANDLER and user application use the externally defined LRDs and that Logical I/O continue to use the internal representation. Newly defined LRDs immediately become available for use by an IOHANDLER.

An IOHANDLER could easily return an appropriate result value simply by using the appropriate mnemonics as defined in ATTABLEGEN. For example, IOH_READ :=VALUE (EOF); or

IOH_WRITE :=VALUE (DATAERROR);

1.11.3 Attribute Results

IOH_GET/SETATTRIBUTE are expected to return a good/bad result. Any specific errors to display are the responsibility of the Library. ATTHANDLE and ATTGRAB will generate GENERICERR for a bad result. As expected, they will also catch normal errors detectable in the MCP (e.g. range checking, READONLY, WRITEONLY, etc.).

1.12 Exception Handling

Any calls into the IOHANDLER are protected within cover functions defined within the IOHandler Structure Block. Proper NOGOPAST protection is enabled during calls into the library. In order to properly handle DS above Logical I/O while executing within the IOHANDLER library, the following strategy is used.

When the process is DSed, KANGAROO will initially intercept the IOHANDLER code and INTERCEDE will eventually PROCESSKILL the stack. GOTOSOLVER will then transfer control to the NOGOPAST label within the Logical I/O cover function. At this point, KANGAROO is invoked again using the current task history and appropriate result will be returned for that particular function.

This is to ensure that the stack is DSed upon exiting Logical I/O. This also handles the interleaving of MCP and user code where an IOHANDLER has opened a virtual file as part of processing its virtual file (i.e., the internal file F passed to an IOHANDLER was assigned to another virtual file).

When close is called as part of a BLOCKEXIT action AND the stack is in the DSed state, the task's history is saved and the current history set to DSEDINEPILOG prior to calling into the IOHANDLER's close routine. Upon return from the IOHANDLER, the saved history is restored. This gives an IOHANDLER a reasonable chance at executing properly when it's close routine is invoked while DSing the stack as is the case for typical EPILOG handling.

2 Documentation 2.1 File Attributes 2.1.1 General File Attributes

| IOHLIBACCESS | |
|---|---|
| Kinds | Virtual |
| Interrogate | Anytime |
| Modify | When Closed |
| Type | Mnemonic |
| Range | BYTITLE, BYFUNCTION, BYINITIATOR |
| Default | BYTITLE |
| Stored Permanently | No |
| Parameters | None |
| FTAM File Access | Not applicable |
| Host Services Logical I/O | Not applicable |
| Port Services | Not applicable |

The IOHLIBACCESS attribute specifies the form of library linkage to be used when linking to the IOHANDLER library as part of opening a virtual file (i.e., a file with KIND=VIRTUAL specified). It is used in conjunction with IOHTITLE or IOHFUNCTIONNAME to select the appropriate IOHANDLER library when set to BYTITLE or BYFUNCTION respectively.

| IOHFUNCTIONNAME | |
|---|---|
| Kinds | Virtual |
| Interrogate | Anytime |
| Modify | When Unassigned |
| Type | Simple name |

-continued

IOHFUNCTIONNAME

| Kinds | Virtual |
|---|---|
| Range | Not applicable |
| Default | See below |
| Stored Permanently | No |
| Parameters | None |
| FTAM File Access | Not applicable |
| Host Services Logical I/O | Not applicable |
| Port Services | Not applicable |

The IOHFUNCTIONNAME attribute specifies the library function name to be used when linking to the IOHANDLER library as part of opening a virtual file (i.e., a file with KIND=VIRTUAL specified). It is used to select the IOHANDLER library when IOHLIBACCESS has been set to BYFUNCTION.

When IOHLIBACCESS is BYFUNCTION and IOHFUNCTIONNAME is unspecified, then a library function name of IOHANDLER is used.

IOHINTERFACENAME

| Kinds | Virtual |
|---|---|
| Interrogate | Anytime |
| Modify | When Unassigned |
| Type | Simple Name |
| Range | Not applicable |
| Default | Unassigned |
| Stored Permanently | No |
| Parameters | None |
| FTAM File Access | Not applicable |
| Host Services Logical I/O | Not applicable |
| Port Services | Not applicable |

The IOHINTERFACENAME attribute specifies the library interface name (e.g., INTERFACENAME attribute) to be used when linking to the IOHANDLER library as part of opening a virtual file (i.e., a file with KIND=VIRTUAL specified).

IOHTITLE

| Kinds | Virtual |
|---|---|
| Interrogate | Anytime |
| Modify | When Unassigned |
| Type | Name |
| Range | Not applicable |
| Default | See below |
| Stored Permanently | No |
| Parameters | None |
| FTAM File Access | Not applicable |
| Host Services Logical I/O | Not applicable |
| Port Services | Not applicable |

The IOHTITLE attribute specifies the library code file title to be used when linking to the IOHANDLER library as part of opening a virtual file (i.e., a file with KIND=VIRTUAL specified). It is used to select the IOHANDLER library when IOHLIBACCESS has been set to BYTITLE or when IOHLIBACCESS is unspecified.

When IOHLIBACCESS is BYTITLE or unspecified and IOHTITLE is unspecified, then a library title of IOHANDLER will be used.

IOHPREFIX

| Kinds | Virtual |
|---|---|
| Interrogate | Anytime |
| Modify | When Unassigned |
| Type | Simple name |
| Range | Not applicable |
| Default | Unassigned |
| Stored Permanently | No |
| Parameters | None |
| FTAM File Access | Not applicable |
| Host Services Logical I/O | Not applicable |
| Port Services | Not applicable |

The IOHPREFIX attribute is used to dynamically select the name of the IOHANDLER entry points when linking to the IOHANDLER library as part of opening a virtual file (i.e., a file with KIND=VIRTUAL specified). The prefix string is combined with the entry point names OPEN, CLOSE, READ and WRITE to produce the actual name used during the library linkage. That is, <IOHPREFIX>OPEN, <IOHPREFIX>CLOSE, <IOHPREFIX>READ and <IOHPREFIX>WRITE.

For example, if the IOHPREFIX attribute is set to the string "MY_" as follows:

REPLACE F.IOHPREFIX BY "MY_.";

Then the entry point names used during library linkage will be MY_OPEN, MY_CLOSE, MY_READ and MY_WRITE.

This attribute allows one library to implement multiple types of virtual files.

IOHLIBPARAMETER

| Kinds | Virtual |
|---|---|
| Interrogate | Anytime |
| Modify | When Unassigned |
| Type | String |
| Range | Not applicable |
| Default | Unassigned |
| Stored Permanently | No |
| Parameters | None |
| FTAM File Access | Not applicable |
| Host Services Logical I/O | Not applicable |
| Port Services | Not applicable |

The IOHLIBPARAMETER attribute specifies the library parameter (e.g., LIBPARAMETER attribute) to be used when linking to the IOHANDLER library as part of opening a virtual file (i.e., a file with KIND=VIRTUAL specified).

IOHSTRING

| Kinds | Virtual |
|---|---|
| Interrogate | Anytime |
| Modify | Anytime |
| Type | String |
| Range | Not applicable |
| Default | Unassigned |
| Stored Permanently | No |
| Parameters | None |
| FTAM File Access | Not applicable |
| Host Services Logical I/O | Not applicable |
| Port Services | Not applicable |

The IOHSTRING attribute can be used to pass information between an IOHANDLER library and the application using a virtual file (e.g., a file with KIND=VIRTUAL specified).

When the IOHSTRING attribute is interrogated for an unassigned logical file, the value to which it was last set on the unassigned file is returned. If it is not set, then "." is returned. When the attribute is interrogated on an assigned virtual file, then any value that is returned is generated by the appropriate IOHANDLER, provided that the IOHANDLER has 1) provided the appropriate IOH_GETATTRIBUTE interface and 2) has provided the appropriate support for this attribute.

When the IOHSTRING attribute is assigned on an unassigned logical file, the value is stored in the logical file. When the attribute is assigned on an assigned virtual file, then the value is passed to the appropriate IOHANDLER, provided that the IOHANDLER has provided the appropriate IOH_SETATTRIBUTE interface. It is the IOHANDLER's responsibility to then process the assignment.

2.1.2 New OPEN, CLOSE and RESPOND Results

The following OPEN Results are defined in support of the implementation of files with KIND=VIRTUAL.

368 (IOHEXCEPTIONRSLT)

A fault occurred during the OPEN or CLOSE of a Virtual File.

370 (IOHLINKAGERSLT)

The MCP was unable to link to the IOHANDLER Library supplied for the Virtual File.

372 (IOHOPENCLOSERSLT)

An open error occurred opening a Virtual File.

374 (IOHVERSIONRSLT)

A version mismatch was reported by the IOHANDLER Library during the open of a Virtual File.

376 (IOHSTRINGERRRSLT)

The IOHANDLER detected an error in the IOHSTRING parameter set on the Virtual File and passed to the IOHANDLER Library open procedure.

2.2 I/O Subsystems Programming 2.2.1 KIND Attribute

KIND=VIRTUAL: The contents and attributes of this file are defined and manipulated by a library known as an IOHANDLER outside the operating system. However program access is the same as for other devices with respect to language constructs.

2.2.2 Understanding Virtual Files 2.2.2.1 Introduction

Virtual files provide a mechanism through which a program in an MCP environment can utilize features provided outside the MCP using native language constructs (e.g., OPEN, CLOSE, READ and WRITE). The MCP provides integrated, generic support for linking to a library implementing the various program requested file operations. This library is referred to as the IOHANDLER for the virtual file.

The need for the virtual file feature can best be understood by thinking of an application that wishes to access resources using the traditional I/O intrinsics such as READ and WRITE but the I/O subsystem does not support access to the resource. The developer is able to build a library that contains the implementation for accessing this resource but there is no way for the application to get at the library using the I/O intrinsics. The virtual file mechanism provides MCP support to enable such an application to utilize the implementation that resides in the developer's external library transparently. Instead of declaring the library and entry points in the application, the library is accessed by opening a logical file with appropriate attributes specified. Once the open is successfully performed, the application utilizes the library through normal READ, WRITE and attribute modification statements.

The capabilities of using the virtual file feature are quite flexible. It should be noted that the "resource" referred to does not need to be a physical device. Because of the generic implementation, different libraries may be implemented to transform the various file operations into an unlimited variety of functions. Some examples include handling a new network protocol, access to database management systems, user transformation of data, etc. The possibilities are really only limited by the imagination of the IOHANDLER developer.

2.2.2.2 Using Virtual Files

From the point of view of the programmer, virtual files appear to be just another type of file. Attributes can be set and the files can be opened, closed, read from and written to. However, instead of communicating with an I/O device, the program communicates with a user or Unisys provided IOHANDLER Library. Because the IOHANDLER implements the semantics of a virtual file, this section can only give a general overview of virtual file concepts. However, greater detail is provided in the topic "Understanding the IOHANDLER".

2.2.2.2.1 Programming for Virtual Files

Virtual files are generally used in a program in the same manner as other types of files. However, there are certain concepts specific to using a virtual file that are described in this section.

While virtual files are handled by the IOHANDLER rather than the I/O subsystem, there are well-defined semantics for programs using virtual files. To describe these semantics it is sometimes useful to think of the IOHANDLER library as the "physical" file corresponding to the "logical" virtual file declared in the program. The IOHANDLER uses attributes specified on the "logical" file to locate or create the "physical" file, and returns attributes for use by the MCP and program in processing operations on the "logical" file.

For example, when the "logical" virtual file specifies the attributes NEWFILE=FALSE, and DEPENDENTSPECS=TRUE, the IOHANDLER open routine returns values corresponding to the "physical" file. These attributes are then set on the virtual file in a manner similar to other file implementations.

It should also be noted that the virtual file implementation does not support DIRECT I/O.

2.2.2.2.1.1 Virtual File Library Attributes

Setting the file's KIND to VIRTUAL indicates that an IOHANDLER library will provide the functionality for the OPEN, CLOSE, READ and WRITE intrinsics. Because of this, it is necessary for the MCP to be able to locate the IOHANDLER and entry points to service the file operation. As such, new file attributes are used in the virtual file declaration to specify the location and the characteristics of the IOHANDLER library. These attributes are listed below, and described in detail in the File Attribute Programming Reference Manual. With the exception of the IOHSTRING and IOHPREFIX attributes, the new attributes specify the form of library linkage to be used when linking to the IOHANDLER library as part of opening a virtual file. These attributes are consistent with their LIBRARY attribute counterparts and are defined to provide a comprehensive set of library functionality.

IOHLIBACCESS

The IOHLIBACCESS attribute is used to specify the form of library access (e.g., BYTITLE, BYFUNCTION, BYINITIATOR) and is consistent with the LIBACCESS library attribute.

IOHFUNCTIONNAME

The IOHFUNCTIONNAME attribute specifies the library function name when library access is BYFUNCTION and is consistent with the FUNCTIONNAME library attribute.

IOHTITLE

The IOHTITLE attribute-specifies the library title when library access is BYTITLE and is consistent with the library TITLE attribute.

IOHINTERFACENAME

The IOHINTERFACENAME corresponds to the INTERFACENAME library attribute.

IOHLIBPARAMETER

The IOHLIBPARAMETER corresponds to the LIBPARAMETER library attribute.

IOHPREFIX

The IOHPREFIX attribute specifies the prefix string to be used when specifying the actual name of the entry points prior to linking to the IOHANDLER library.

IOHSTRING

The IOHSTRING attribute provides an IPC mechanism between the application using the VIRTUAL file and the IOHANDLER library that can be useful for propagating information in and out of the library.

These IOHANDLER library attributes are intended to provide a flexible, comprehensive linkage mechanism. The following file declarations illustrate how a program might specify a virtual file using the above attributes:

FILE VF1 (KIND=VIRTUAL, IOHLIBACCESS= BYTITLE, IOHLIBTITLE="OBJECT/ MYIOHANDLER.", . . . );

FILE VF2 (KIND=VIRTUAL, IOHLIBACCESS= BYFUNCTION, IOHFUNCTIONNAME= "MYIOHSUPPORT.", . . . );

The linkage to the IOHANDLER library is accomplished by transferring the library attributes declared on the virtual file to the internal library ("IOHANDLER") declared for the file. For example, the IOHFUNCTIONNAME becomes the FUNCTIONNAME name of the internal library. Linkage is therefore the same as if the program declaration included a LIBRARY IOHANDLER and used some or all default values for the library's attributes.

The only exception in this linkage scheme is in the transferring of IOHLIBACCESS to the LIBACCESS specification for the internal library when an IOHFUNCTIONNAME has been specified in the absence of a specification for IOHTITLE and IOHLIBACCESS. In this case, a value of BYFUNCTION is specified on the LIBACCESS of the internal library, rather than allowing it to take the default value of BYTITLE. This simplifies setting of the virtual file library attributes by making it unnecessary to set both IOHLIBACCESS to BYFUNCTION and specifying the IOHFUNCTIONNAME. Also of note, is that when IOHPREFIX is unspecified, the entry points are assumed to have a prefix of "IOH_". That is, the entry points are named IOH_OPEN, IOH_CLOSE, etc. For example, consider the following file declarations.

FILE VF3 (KIND=VIRTUAL);

FILE VF4 (KIND=VIRTUAL, IOHLIBACCESS= BYFUNCTION);

FILE VF5 (KIND=VIRTUAL, IOHPREFIX= "MYDISK.");

For file VF3, library linkage is performed using a library access of BYTITLE and a code file title of IOHANDLER. For file VF4, library linkage will be performed using a library access of BYFUNCTION and a function name of IOHANDLER. In either case, the entry point names will are the default names described above. For file VF5, library linkage will be the same as that of file VF3 except the library entry points are named MYDISKOPEN, MYDISKCLOSE, MYDISKREAD and MYDISKWRITE.

2.2.2.2.1.2 Virtual File Structure Considerations

Virtual files only support a subset of file format attributes as summarized in the following list. Attributes not specified in the list below either are ignored as being irrelevant to virtual files (e.g., AREASIZE), or all values are supported (e.g. FRAMESIZE). Values specified on the virtual file for the following attributes are passed to the IOHANDLER open procedure for its utilization. A complete discussion of attributes is discussed in a later section.

FILEORGANIZATION

The only supported value is NOTRESTRICTED.

FILESTRUCTURE

The FILESTRUCTURE of a virtual file is ignored when set on the virtual file.

BLOCKSTRUCTURE

The valid values are FIXED and EXTERNAL. When specified on a virtual file, the value returned by the IOHANDLER open procedure must match this value.

FILETYPE

Only values of 0 and 3 are supported, corresponding to BLOCKSTRUCTURE values of FIXED and EXTERNAL, respectively.

MINRECSIZE

A MINRECSIZE value set on a virtual file is ignored. It is set to the MAXRECSIZE for BLOCKSTRUCTURE= FIXED, and to 0 for BLOCKSTRUCTURE=EXTERNAL.

MAXRECSIZE

The IOHANDLER open routine returns a value in IOHMODE characters of its MAXRECSIZE. If DEPENDENTSPECS is TRUE for the virtual file, the MAXRECSIZE is adjusted to match the IOHANDLER value, adjusting for the INTMODE of the virtual file.EXTMODE The IOHANDLER returns a value of IOHMODE that corresponds to the mode that the library is operating in for this virtual file. The IOHANDLER IOHMODE and the virtual file EXTMODE are compared for compatibility at open time, adjusting for any OVERRIDEEXTMODE specification.

The interface between the MCP Logical I/O module and the IOHANDLER library dictates some of the above restrictions. This interface is more fully described in the "Understanding the IOHANDLER" section, but is outlined here in order to clarify virtual file requirements.

The IOHANDLER library's read and write routines are random record oriented interfaces. That is, the IOHANDLER read and write entry points always expect a record offset and a length. The MCP, on behalf of the program, converts any serial access into an appropriate random access based upon the current record pointer. Because there is no blocking of records, the FILESTRUCTURE that corresponds to the interface is inherently STREAM. Since the I/O subsystem is not handling the physical file, the FILESTRUCTURE specified on the logical virtual file may be ignored.

The interface between the MCP and the IOHANDLER is based on EXTMODE character units. That is, the IOHRECSIZE returned from the IOHANDLER open is expressed as a number of EXTMODE characters, and the length parameter to the read and write entry points always refers to the number of characters to be transferred. The MCP therefore also, on behalf of the program, converts the length of the request into characters if required. For example, if the FRAMESIZE of the logical file is 48 (words) and the EXTMODE is EBCDIC, the length passed into the IOHANDLER by is adjusted by a multiple of 6. Similarly, the result returned by the IOHANDLER after a successful read or write operation is converted back to words when expressing the length in the result descriptor. Note that the MCP maintains the file state of the logical virtual file consistent with its specified MAXRECSIZE value after each I/O. As part of the file open process, the MCP will ensure that the IOHANDLER's interpretation of logical record size is the same as the program's interpretation of logical record size, based on the following expression:

Virtual File: $MAXRECSIZE*$BITS PER $EXTFRAME=IOHANDLER: IOHRECSIZE*$BITS PER $IOHMODE$ CHARACTER A BLOCKSTRUCTURE of either FIXED or EXTERNAL is supported and it is the IOHANDLER's responsibility to return a proper BLOCKSTRUCTURE value as part of the open. Any value other than FIXED or EXTERNAL returned by the IOHANDLER, or a mismatch between the logical and virtual files results in an open error. The differences between BLOCKSTRUCTURE FIXED and EXTERNAL for virtual files is described in the following paragraphs.

For BLOCKSTRUCTURE=FIXED, all requests to the IOHANDLER are rounded up to the nearest record boundary. For a read operation, the length passed to the IOHANDLER is rounded up to the nearest record boundary and only the amount actually requested by the program is transferred into the users buffer on return from the IOHANDLER read routine. For a write operation, the write request is padded with zeroes to the end of the record and the request length is adjusted to the record boundary before calling the IOHANDLER write routine. The length returned in the logical result descriptor for the request and stored in the logical file STATE attribute, is always adjusted to a record boundary. For BLOCKSTRUCTURE=EXTERNAL, requests are not rounded up to the next-record and the read or write request made to the IOHANDLER will match the length specified by the program. The length returned in the logical result descriptor (STATE) is not adjusted to a record boundary and will match the actual requested length. However, the record pointer in the FIB is always adjusted to the next record consistent with. MAXRECSIZE. Note that unlike DISK files, the MINRECSIZE is always set to 0 when the BLOCKSTRUCTURE is EXTERNAL.

ANYSIZEIO is also supported for virtual files when BLOCKSTRUCTURE is FIXED, allowing multiple records to be transferred in a single request. When BLOCKSTRUCTURE is EXTERNAL, setting ANYSIZEIO to TRUE results in an open error unless ADAPTABLE is also TRUE. Setting ADAPTABLE to TRUE indicates the programmer has anticipated the possibility that an existing file opened with DEPENDENTSPECS and ANYSIZEIO set to TRUE may have a BLOCKSTRUCTURE of EXTERNAL and wants the open to succeed. As with other files, when ANYSIZEIO is FALSE, read or write requests that exceed MAXRECSIZE are truncated to MAXRECSIZE. The partial portion of any request that is not a multiple of MAXRECSIZE is treated as described above for each BLOCKSTRUCTURE.

2.2.2.2.1.3 Virtual File Attributes

File attributes are set and interrogated on virtual files in the same manner as for any other file. Before the file is opened, the attributes are applied and returned from the unopened file structure. After file open, file attributes supported for virtual files are handled by calling the IOHANDLER. The list of attributes that are handled by the IOHANDLER for virtual files is shown below. These attributes are described in the File Attributes Programming Reference Manual.

FILENAME (and related LFILENAME, TITLE, LTITLE and PATHNAME)
FILEKIND
ALTERDATE
ALTERTIME
CREATIONDATE
CREATIONTIME
ACCESSDATE
ACCESSTIME
SECURITYTYPE
SECURITYUSE
SECURITYMODE (and all related sub attributes)
GROUP
ALTERNATEGROUPS
SECURITYGUARD
OWNER
IOHSTRING
USERINFO
NOTE
SYNCHRONIZE
LASTRECORD
FILESIZE
CCSVERSION
EXTDELIMITER 2.2.2.2.1.4 Virtual File Translation Translation may be provided by Logical I/O when the INTMODE of a file differs from the EXTMODE of that file. Translation is provided for virtual files in this same manner as for other files, but requires coordination with the IOHANDLER library, due to the following. During file open, the IOHANDLER open routine returns the IOHMODE value corresponding to the EXTMODE of a physical file. Because the IOHANDLER effectively adds a third value to the mix (i.e. virtual file INTMODE, EXTMODE and library IOHMODE), there is some additional complexity that is described in this section.

As stated above, the IOHANDLER open routine returns the IOHMODE value representing the character encoding and FRAMESIZE used to interpret the IOHRECSIZE also returned at open time. Normally, when an existing physical file is opened, the EXTMODE value of the logical file unconditionally assumes the EXTMODE value of the physical file. This is the same for virtual files, such that the EXTMODE of the logical virtual file is set to the IOHMODE returned from the library. Also, the EXTMODE of the logical file is normally used when creating a new file. For virtual files, however, the library may chose to return an IOHMODE that differs from the EXTMODE specified on the logical file. Because of this, the EXTMODE of the virtual file is set to the IOHMODE returned from the library, even when new file creation is requested.

Logical I/O also supports the OVERRIDEEXTMODE file attribute to allow the EXTMODE of the logical file to differ from the EXTMODE of the physical file, perhaps to avoid or to cause translation. While OVERRIDEEXTMODE is also honored for virtual files, it has the restriction that the character size of the IOHMODE must match the character size of the EXTMODE of the virtual file. This is consistent with the native MCP implementation.

Once the EXTMODE of the virtual file is determined, it is also compared with the INTMODE specified on the virtual file for compatibility. This comparison is described in Table 2-14, "Possible EXTMODE and INTMODE Combinations". Note that the DEPENDENTINTMODE attribute is also honored for virtual files, and the INTMODE is set to the EXTMODE of the logical file when the attribute is set TRUE. By using DEPENDENTINTMODE, translation will not be done regardless of the EXTMODE specified or the IOHMODE value returned from the library.

2.2.2.2.1.5 Opening a Virtual File

Virtual file open supports the all the various open mechanisms (e.g. OPEN(F), F.AVAILABLE, implicit open on read or write, etc.). The results of the file open continue to be returned as defined in the File Attributes Programming Reference Manual, Appendix E: OPEN, CLOSE and RESPOND Results List.

Opening a virtual file causes the initial link with the desired IOHANDLER. Open validation consists of MCP checks before calling the IOHANDLER, checks made by the IOHANDLER itself, and verification of certain attribute compatibility with the virtual file after values are returned by the IOHANDLER. The checks made by the MCP before calling the IOHANDLER consist of verifying the values of the attributes described in the Virtual File Structure Considerations topic above. In addition, various checks that occur for all file types at open time are also performed.

Once these checks are made, the MCP attempts to link to the IOHANDLER based on the attributes described in the "Virtual File Library Attributes" section above. A structure containing a subset of file attributes either set explicitly or by default is passed to the IOHANDLER Open entry point. These attributes are documented in the "Understanding the IOHANDLER" section. Because the IOHANDLER implements the bulk of the virtual file, its use of file attributes may vary from other file kinds managed by the MCP. As such, the requirements of each IOHANDLER need to be documented by the writer of the library.

Finally, after a successful return from the IOHANDLER open, compatibility with the virtual file structure is performed, and the open result is returned to the application.

2.2.2.2.1.5 Virtual File I/O Requests

Virtual file I/O requests are identical to those used for accessing DISK files with a FILESTRUCTURE of STREAM. The result values returned for I/O requests are as defined in the File Attributes Programming Reference Manual, Appendix F: I/O Result Enumerated Values.

As mentioned previously, ANYSIZEIO access is supported for BLOCKSTRUCTURE=FIXED. UPDATEFILE access is supported, but as with DISK files, ANYSIZEIO must be FALSE. The SYNCHRONIZE directive is valid for the WRITE intrinsic, but it is up to the IOHANDLER to interpret the request and act accordingly. BUFFER SHARING is not supported for virtual files. Any BUFFERSHARING attribute is passed to the IOHANDLER open routine, but it does not cause the MCP to reject the open request. A single buffer is allocated for the file by the MCP for processing the I/O request, however the BUFFERS value is also passed to the IOHANDLER library.

2.2.2.2.2 ALGOL Example

The following example program demonstrates the use of KIND=VIRTUAL in an ALGOL program, utilizing the IOHANDER defined by the IOHFUNCTIONNAME of DISKIOHANDLER. The program reads an existing (ASCII) stream file MYMACS.TXT, that has logical records delimited by carriage return, line feed (CRLF) characters. The data read through the file VF is translated from ASCII to EBCDIC, and written to a new (EBCDIC) stream file VFNEW. Each logical record as delimited by a CRLF is displayed on the remote file RMT. The IOHLIBACCESS and IOHPREFIX defined for VF are the defaults, i.e., the VFNEW file although not specifying IOHLIBACCESS or IOHPREFIX, will linked to by IOHANDLER in an identical fashion.

```
BEGIN
FILE RMT(KIND=REMOTE,
    UNITS=CHARACTERS,
    ,MYUSE=IO);
FILE VF (KIND=VIRTUAL
    ,FILENAME=""MYMACS.TXT""."
    ,NEWFILE=FALSE
    ,DEPENDENTSPECS
    ,EXTMODE=ASCII
    ,INTMODE=EBCDIC
    ,FILEUSE=IN
    ,UNITS=CHARACTERS
    ,ANYSIZEIO
    ,IOHPREFIX="IOH_."
    ,IOHLIBACCESS=BYFUNCTION
    ,IOHFUNCTIONNAME="DISKIOHANDLER."
    );
FILE VFNEW(KIND=VIRTUAL
    ,IOHFUNCTIONNAME="DISKIOHANDLER."
    ,NEWFILE=TRUE
    ,FILEUSE=OUT
    ,FILESTRUCTURE=STREAM
    ,FRAMESIZE=8
    ,MAXRECSIZE=1
    ,ANYSIZEIO
    );
EBCDIC ARRAY EA, EB [0:2999];
POINTER P, PA;
BOOLEAN BRD;
REAL I, J, R, RD=BRD;
DEFINE CR=48"0D"#,
    LF=48"25"#;
TRUTHSET CRLF (CR OR LF);
OPEN (VF);
OPEN (VFNEW);
WHILE NOT BRD DO
BEGIN
    BRD := READ (VF, 3000, EA);
    I := RD.[47:20];
    IF NOT BRD THEN
    BEGIN
        WRITE (VFNEW [J], I, EA);
        J := * + I;
        PA := EA[0];
        DO BEGIN
            REPLACE P:EB[0] BY PA:PA FOR I:I UNTIL IN CRLF;
            WRITE (RMT, OFFSET(P), EB);
            SCAN PA:PA FOR I:I WHILE IN CRLF;
        END
        UNTIL I LEQ 0;
    END;
END;
CLOSE (VFNEW, LOCK);
CLOSE (VF);
END.
```

2.2.2.2.3 COBOL85 Example

The following program is an example of using Virtual Files in a COBOL85 program. The program creates a file using the virtual file F-O, then reads the data using the virtual file F-I-1, displaying the data. Finally, it creates a copy of the virtual file F-O in the disk file F-C. The IOHANDLER used for F-O and F-I-1 is specified using the IOHFUNCTIONNAME DISKIOHANDLER.

```
IDENTIFICATION DIVISION.
ENVIRONMENT DIVISION.
INPUT-OUTPUT SECTION.
FILE-CONTROL.
  SELECT F-I-1 ASSIGN TO DISK.
  SELECT F-O ASSIGN TO DISK.
  SELECT F-C ASSIGN TO DISK.
DATA DIVISION.
FILE SECTION.
FD F-I-1
    VALUE OF FILESTRUCTURE IS STREAM
        ANYSIZEIO IS TRUE
        MAXRECSIZE IS 1
        RECORD   1 CHARACTERS.
01 F-I-1-REC PIC X(1).
FD F-O
    VALUE OF FILESTRUCTURE IS STREAM
        ANYSIZEIO IS TRUE
        MAXRECSIZE IS 1
        EXTMODE IS ASCII
        RECORD   1 CHARACTERS.
* The record establishes the MAXRECSIZE.
01 F-O-REC PIC X(30).
FD F-C
    VALUE OF FILESTRUCTURE IS STREAM
        ANYSIZEIO IS TRUE
        MAXRECSIZE IS 1
        RECORD   1 CHARACTERS.
*       The record establishes the MAXRECSIZE.
01 F-C-REC PIC X(30).
WORKING-STORAGE SECTION.
77 NAME   PIC X(256).
PROCEDURE DIVISION.
MAIN-PARA.
 PERFORM CREATE-F-O.
 PERFORM READ-F-O.
 PERFORM COPY-FILE.
 STOP RUN.
 CREATE-F-O.
 CHANGE ATTRIBUTE UPDATEFILE OF F-O TO FALSE.
 CHANGE ATTRIBUTE KIND OF F-O TO VIRTUAL.
 CHANGE ATTRIBUTE IOHFUNCTIONNAME OF F-O TO
 "DISKIOHANDLER".
 OPEN OUTPUT F-O.
 MOVE "This is the first input" TO F-O-REC.
 WRITE F-O-REC.
 MOVE "The SECOND is shorter" TO F-O-REC.
 WRITE F-O-REC.
 CLOSE F-O SAVE.
 READ-F-O.
 MOVE ATTRIBUTE TITLE OF F-O TO NAME.
 CHANGE ATTRIBUTE TITLE OF F-I-1 TO NAME.
 CHANGE ATTRIBUTE KIND OF F-I-1 TO VIRTUAL.
 CHANGE ATTRIBUTE IOHFUNCTIONNAME OF F-I-1 TO
 "DISKIOHANDLER".
 DISPLAY "Read the file character at a time".
 OPEN INPUT F-I-1.
 PERFORM READ-LOOP-1
 CLOSE F-I-1.
 READ-LOOP-1.
 READ F-I-1
    AT END
       DISPLAY "DONE READING"
    NOT AT END
       DISPLAY F-I-1-REC
       GO TO READ-LOOP-1.
 COPY-FILE.
 OPEN INPUT F-O.
 OPEN OUTPUT F-C.
 PERFORM COPY-LOOP.
 CLOSE F-O.
 CLOSE F-C SAVE.
 COPY-LOOP.
 READ F-O
    AT END DISPLAY "DONE COPYING"
    NOT AT END
       MOVE F-O-REC TO F-C-REC
       WRITE F-C-REC
       GO TO COPY-LOOP.
```

2.2.2.3 Virtual File IOHANDLER

The functionality of the virtual file is provided by a library linked to the user program's file, referred to as an IOHANDLER. Logical I/O provides generic support to allow the virtual file declared in a program access to a particular IOHANDLER. When a virtual file is opened, a linkage to the appropriate IOHANDLER is established and control passed to the IOHANDLER open entry point. Similarly when a READ or WRITE is performed by the application, control is passed from Logical I/O to the IOHANDLER read or write entry point. When the virtual file is closed, the IOHANDLER close entry point is invoked and the file is delinked from the IOHANDLER library.

This section provides the information required to create an IOHANDLER Library.

2.2.2.3.1 Understanding the IOHANDLER

The IOHANDLER library is expected to export entry points that are written to adhere to a well-defined protocol consistent with normal device handling. Each entry point is called from Logical I/O as part of processing a native language I/O statement on the program-declared virtual file, such as a READ, or attribute modification request.

The invocation of each IOHANDLER entry point via the virtual file results in an important side effect. In particular, Logical I/O insures the integrity of a file that is visible to more than one process (e.g. a program with offspring) by securing a lock in the file description before acting on the file. Because Logical I/O provides this insurance, the IOHANDLER programmer does not need to be concerned with locking the structures associated with a particular virtual file. This concept, along with common IOHANDLER entry point parameters described below is intended to simplify the creation of an IOHANDLER library that requires only a single instantiation, i.e., a SHAREDBYALL library.

The IOHANDLER entry points and the functions they are called for are described in the following table. The definitions and descriptions of each of these entry points are described in individual sections further along in the document.

| Entry Point | Language Function | Required |
| --- | --- | --- |
| IOH_OPEN | OPEN, PRESENT, AVAILABLE and RESIDENT functions, as well as implicit open. | Yes |
| IOH_CLOSE | Explicit CLOSE as well as block exit close. | Yes |
| IOH_READ | Serial or Random READ request. | No |
| IOH_WRITE | Serial or Random WRITE request. | No |
| IOH_GETATTRIBUTE | Interrogation of supported Attributes | No |
| IOH_SETATTRIBUTE | Setting supported Attributes | No |
| IOH_ERASEFILE | ALGOL ERASE, and MCP ERASEFILE functions | No |
| IOH_FSYNC | POSIX FSYNC, and MCP FILESYNC functions | No |

Linkage to the IOHANDLER occurs when an attempt is made to open the virtual file. Note that not all IOHANDLER entry points are required during linkage to the library on behalf of a virtual file. However, if all of the required entry points are not exported by the IOHANDLER, the linkage from the virtual file to the specified IOHANDLER will fail and an open error on the virtual file will be returned to the program. On the other hand, if an optional entry point is not provided by a particular IOHANDLER, an error result is only produced if an action on the virtual file requires the optional entry point. The one exception to this is for IOH_FSYNC, which simply returns a good result, as described with the documentation for IOH_FSYNC.

2.2.2.3.2 IOHANDLER Entry Points

This section documents the declaration of each of the IOHANDLER entry points and describes their parameters.

2.2.2.3.2.1 Common IOHANDLER Entry Point Parameters

Each entry point exported by an IOHANDLER library has two common parameters, declared as the first two entries in the parameter list. Since they are common to all IOHANDLER entry points they are documented separately here.

The common IOHANDLER parameters are a file, and a two-dimensional array, declared in Logical I/O, and referred to as F and IOH_DATA, respectively. While Logical I/O has visibility to each of these parameters, they are provided solely for the use of the library, and are never referenced by Logical I/O. As such, they can be used by the library as it sees fit. In particular, since they are passed to all IOHANDLER entry points, they can be used to hold state information about the particular virtual file without storing global state in the library. This handling of the F and IOH_DATA parameters, coupled with the file locking as described above in "Understanding the IOHANDLER" is intended to make it easy for an IOHANDLER to be written as a state-less, shared library. Such a library is included in the example IOHANDLER included in this document.

The states of the two parameters on initial linkage are as follows. First, the IOH_DATA parameter is a non-present, touched multi-dimensioned array declared with 4 rows, which can be resized with minimal overhead according to the needs of the IOHANDLER. Second, the file parameter F is an unassigned file descriptor with default file attributes. It should be noted that file equation from the program declaring the virtual file is not applied when the file is initialized.

2.2.2.3.2.2 IOH_OPEN

The required entry point, IOH_OPEN, is invoked when the virtual file is opened. It is expected to return an open result along with values for the by-reference parameters. It must exported to be compatible with the following procedure template.

```
REAL PROCEDURE IOH_OPEN (F, IOH_DATA IOH_INFO,
                IOHRECSIZE, IOHMODE, IOHMAXXMTRECS,
                IOHACCESS, IOHBLOCKSTRUCTURE);
    FILE F;
    ARRAY IOH_DATA [0,0], IOH_INFO [0];
    REAL IOHRECSIZE, IOHMODE, IOHMAXXMTRECS,
        IOHACCESS, IOHBLOCKSTRUCTURE;
```

Results:

The result returned as the procedure value is expected to be a value as defined in the File Attributes Programming Reference Manual, Appendix E: "OPEN, CLOSE and RESPOND Results". These values are supported by the compilers, such that the mnemonic values may be used. For example, the following statements would return the appropriate values of a good result, or a no file condition, respectively:

IOH_OPEN :=VALUE(OKRSLT);

IOH_OPEN :=VALUE(NOFILEFOUNDRSLT);

Parameters:

IOHRECSIZE

The IOHRECSIZE parameter returned by the open entry point is the MAXRECSIZE in units of IOHMODE characters of the virtual file.

IOHMODE

The IOHMODE parameter returned by the open entry point is the character encoding and size expected in the read and write entry points. That is, the length of the data, and the pointer passed to those entry points are sized according to the IOHMODE value returned.

IOHMAXXMTRECS

The IOHMAXXMTRECS parameter returned by the open entry point is the maximum number of records that can be transferred in and out of the library on a single call to its read/write routine.

IOHACCESS

The IOHACCESS parameter returned by the open entry point is the access permissions that have been granted and has the following layout:

```
SEC_RF = [2:1] # % Read permitted
SEC_WF = [1:1] #% Write permitted
SEC_XF = [0:1] # % Execute/search permitted
                            %(not currently used but defined
                            % for completeness.)
```

IOHBLOCKSTRUCTURE

The IOHBLOCKSTRUCTURE parameter returned by the open routine contains the BLOCKSTRUCTURE of the virtual file. This must be either VALUE (FIXED) or VALUE (EXTERNAL).

IOH_INFO

The IOH_INFO array passed in to the open routine contains information from the logical virtual file as defined below. Each of the defines corresponds to the file attribute value that it carries. For example, INFO_ANYSIZEIO contains the ANYSIZEIO setting on the virtual file. Pointer valued attributes are passed using an index and length define. For example, INFO_FILENAMEINX, and INFO_FILENAMECHRS are the index in IOH_INFO, and the length respectively, of the virtual file FILENAME attribute. Note that pointer attributes are terminated with a period, which is included in the length.

```
DEFINE
    INFO_ITEMP     (INFO,X) = POINTER(INFO[X]) #
    ,INFO_WORDS    (INFO) = INFO [0].[47:24] #
    ,INFO_FIXED_WORDS (INFO) = INFO [0].[23:24] #
    ,INFO_VERSION  (INFO) = INFO [1].[07:08] #
        ,INFO_VERSIONV     = 1 #
    ,INFO_OPENATTRIBUTE (INFO) = INFO [2].[36:01] #
    ,INFO_OPENIMPLICIT (INFO) = INFO [2].[32:01] #
    ,INFO_OPENTYPE    (INFO) = INFO [2].[31:08] #
    ,INFO_NEWFILE     (INFO) = INFO [2].[23:01] #
    ,INFO_EXCLUSIVE   (INFO) = INFO [2].[22:01] #
    ,INFO_FILEUSE     (INFO) = INFO [2].[21:02] #
    ,INFO_FLEXIBLE    (INFO) = INFO [2].[19:01] #
    ,INFO_NORESOURCEWAIT (INFO) = INFO [2].[18:01] #
    ,INFO_SENSITIVEDATA (INFO) = INFO [2].[17:01] #
    ,INFO_DEPENDENTINTMODE(INFO) = INFO [2].[16:01] #
    ,INFO_DEPENDENTSPECS (INFO) = INFO [2].[12:01] #
    ,INFO_PROTECTION   (INFO) = INFO [2].[11:02] #
    ,INFO_SYNCHRONIZE  (INFO) = INFO [2].[09:02] #
    ,INFO_FILEKIND     (INFO) = INFO [2].[07:08] #
    ,INFO_FILEORGANIZATION(INFO) = INFO [3].[43:04] #
    ,INFO_FILESTRUCTURE (INFO) = INFO [3].[39:08] #
```

-continued

```
,INFO_BLOCKSTRUCTURE (INFO) = INFO [3].[31:04] #
,INFO_EXTMODEBITS    (INFO) = INFO [3].[27:08] #
,INFO_OVERRIDEEXTMODE (INFO) = INFO [3].[19:04] #
,INFO_EXTMODE    (INFO) = INFO [3].[15:16] #
,INFO_INTMODE    (INFO) = INFO [4].[47:16] #
,INFO_CCSVERSION    (INFO) = INFO [4].[31:16] #
,INFO_EXTDELIMITER  (INFO) = INFO [4].[15:08] #
,INFO_FRAMESIZE    (INFO) = INFO [4].[07:08] #
,INFO_BLOCKSIZE    (INFO) = INFO [5].[47:16] #
,INFO_MINRECSIZE    (INFO) = INFO [5].[31:16] #
,INFO_MAXRECSIZE    (INFO) = INFO [5].[15:16] #
,INFO_ANYSIZEIO    (INFO) = INFO [6].[44:01] #
,INFO_ADAPTABLE    (INFO) = INFO [6].[40:01] #
,INFO_UNITS    (INFO) = INFO [6].[36:01] #
,INFO_BUFFERSHARING (INFO) = INFO [6].[33:02] #
,INFO_BUFFERS    (INFO) = INFO [6].[31:08] #
,INFO_BUFFERSIZE    (INFO) = INFO [6].[23:24] #
,INFO_AREAS    (INFO) = INFO [7].[47:16] #
,INFO_AREALENGTH    (INFO) = INFO [7].[31:32] #
,INFO_AREASIZE    (INFO) = INFO [8].[47:24] #
,INFO_SECURITYTYPE (INFO) = INFO [8].[23:04] #
,INFO_SECURITYUSE (INFO) = INFO [8].[19:04] #
,INFO_SECURITYMODE  (INFO) = INFO [8].[15:16] #
,INFO_FILESNR    (INFO) = INFO [9] #
,INFO_FILEMIX    (INFO) = INFO [10] #
% Variable Length Attributes
,INFO_ATT_LINKF = [47:24] #
,INFO_ATT_LENF = [23:24] #
,INFO_FILENAMEINX   (INFO) = INFO
   [11].INFO_ATT_LINKF #
,INFO_FILENAMECHRS   (INFO) = INFO
   [11].INFO_ATT_LENF #
,INFO_FAMILYNAMEINX (INFO) = INFO
   [12].INFO_ATT_LINKF #
,INFO_FAMILYNAMECHRS (INFO) = INFO
   [12].INFO_ATT_LENF #
,INFO_STRINGINX    (INFO) = INFO
   [13].INFO_ATT_LINKF #
,INFO_STRINGCHRS    (INFO) = INFO
   [13].INFO_ATT_LENF #
,INFO_FILEUCINX    (INFO) = INFO
   [14].INFO_ATT_LINKF #
,INFO_FILEUCCHRS    (INFO) = INFO
   [14].INFO_ATT_LENF #
,INFO_NOTEINX    (INFO) = INFO
   [15].INFO_ATT_LINKF #
,INFO_NOTECHRS    (INFO) = INFO
   [15].INFO_ATT_LENF #
,INFO_GUARDFILEINX    (INFO) = INFO
   [16].INFO_ATT_LINKF #
,INFO_GUARDFILECHRS (INFO) = INFO
   [16].INFO_ATT_LENF #
,INFO_GROUPINX    (INFO) = INFO
   [17].INFO_ATT_LINKF #
,INFO_GROUPCHRS    (INFO) = INFO
   [17].INFO_ATT_LENF #
,INFO_ALTGROUPSINX   (INFO) = INFO
   [18].INFO_ATT_LINKF #
,INFO_ALTGROUPSCHRS (INFO) = INFO
   [18].INFO_ATT_LENF #
,INFO_OWNERINX    (INFO) = INFO
   [19].INFO_ATT_LINKF #
,INFO_OWNERCHRS    (INFO) = INFO
   [19].INFO_ATT_LENF #
,INFO_INTNAMEINX    (INFO) = INFO
   [20].INFO_ATT_LINKF #
,INFO_INTNAMECHRS    (INFO) = INFO
   [20].INFO_ATT_LENF #
,INFO_HOSTNAMEINX    (INFO) = INFO
   [21].INFO_ATT_LINKF #
,INFO_HOSTNAMECHRS    (INFO) = INFO
   [21].INFO_ATT_LENF #
,INFO_FIRSTINFO    = 22 #
```

2.2.2.3.2.3 IOH_CLOSE

The required entry point, IOH_CLOSE, is invoked when the virtual file is closed, either explicitly, or due to block exit action. It must be exported to be compatible with the following procedure template.

```
REAL PROCEDURE IOH_CLOSE (F, IOH_DATA, ASSOCIATION,
                         DISPOSITION);
   VALUE ASSOCIATION, DISPOSITION;
   FILE F;
   ARRAY IOH_DATA [0:0];
   REAL ASSOCIATION, DISPOSITION;
```

Results:
The result returned as the procedure value is expected to be a value as defined in the File Attributes Programming Reference Manual, Appendix E: "OPEN, CLOSE and RESPOND Results". These values are supported by the compilers, such that the mnemonic values may be used. For example, the following statement would return the appropriate good result value for the CLOSE request:

IOH_CLOSE := VALUE(OKRSLT);

Parameters:
The ASSOCIATION and DISPOSITION parameters passed into the close entry point indicate the type of close operation and correspond to the compiler generated values passed to Logical I/O. Note that while the possible values of ASSOCIATION are listed below, the IOH_CLOSE entry point is currently only called for a value of RELEASE.

| ASSOCIATION | |
|---|---|
| RELEASE | 1 |
| RETAIN | 2 |
| RESERVE | 3 |
| DISABLE | 4 |

| DISPOSITION | |
|---|---|
| REWIND | 1 |
| NOREWIND | 2 |
| SAVE | 3 |
| LOCK | 4 |
| PURGE | 5 |
| CRUNCH | 6 |
| HERE | 7 |
| BLOCKEXIT | 8 |
| ABORT | 9 |
| ORDERLY | 10 |
| DOWNSIZEAREA | 11 |
| DOWNSIZEAREALOCK | 12 |

2.2.2.3.2.4 IOH_READ

The optional IOH_READ entry point is required to service a READ request on the virtual file. If exported it must be compatible with the following procedure template.

REAL PROCEDURE IOH_READ (F, IOH_DATA, FEATUREMASK, REC, LEN, PDATA);
      VALUE FEATUREMASK, REC, PDATA;
      FILE F;
      ARRAY IOH_DATA [0:0];
      REAL FEATUREMASK, REC, LEN;
      POINTER PDATA;

Results:
The result returned as the procedure value is expected to be a value as defined in the File Attributes Programming Reference Manual, Appendix F: "I/O Result Enumerated Values". These values are supported by the compilers, such that the mnemonic values may be used. For example, the following statement would return the appropriate good result value for the READ request:

IOH_READ :=VALUE(NOERROR);
Parameters:
FEATUREMASK

The FEATUREMASK parameter contains an indication that the READ requested was serial or random, in the following field:

SERIAL_REQUESTF=[1:1] # % Indicates Serial read/write
REC

The REC parameter is the record offset for the READ request.

LEN

The LEN parameter is the length of the request in terms of IOHMODE characters. The value returned in LEN indicates how much data was actually transferred. The LEN returned from the entry point must be less than or equal to the requested value, or a DATAERROR result is returned to the program. If LEN is less than requested the MCP will build a result descriptor based on the IOHBLOCKSTRUCTURE returned from the open. For a discussion of BLOCKSTURCTURE semantics, see the section above entitled "Virtual File Structure Considerations".

PDATA

The PDATA parameter points to the internal Logical I/O buffer used to hold the user data during the I/O request. The pointer size is set based on the IOHMODE returned from IOH_OPEN. The PDATA, REC and LEN parameters are used to move data out of the library.

2.2.2.3.2.5 IOH_WRITE

The optional IOH_WRITE entry point is required to service a WRITE request on the virtual file. If exported it must be compatible with the following procedure template.

REAL PROCEDURE IOH_WRITE (F. IOH_DATA, FEATUREMASK, REC, LEN, PDATA);
VALUE FEATUREMASK, REC, PDATA;
FILE F;
ARRAY IOH_DATA [0:0];
REAL FEATUREMASK, REC, LEN;
POINTER PDATA;

Results:

The result returned as the procedure value is expected to be a value as defined in the File Attributes Programming Reference Manual, Appendix F: "I/O Result Enumerated Values". These values are supported by the compilers, such that the mnemonic values may be used. For example, the following statement would return the appropriate good result value for the WRITE request:

IOH_WRITE :=VALUE(NOERROR);
Parameters:
FEATUREMASK

The FEATUREMASK parameter contains an indication that the READ requested was serial or random, and if SYNCHRONIZE was specified. The layout of the FEATUREMASK is as follows:

SERIAL_REQUESTF=[1:1]# % Indicates Serial read/write
WRITE_SYNCF=[0:1]# % Write [SYNCHRONIZE]
REC The REC parameter is the record offset for the WRITE request.

LEN

The LEN parameter is the length of the request in terms of IOHMODE characters. The value returned in LEN indicates how much data was actually transferred. The LEN returned from the entry point must be equal to the requested value, or a DATAERROR result is returned to the program. The LEN may have been adjusted by Logical I/O to a record boundary based on the IOHBLOCKSTRUCTURE returned from the open. For a discussion of BLOCKSTURCTURE semantics, see the section above entitled "Virtual File Structure Considerations".

PDATA

The PDATA parameter points to the internal Logical I/O buffer used to hold the user data during the I/O request. The pointer size is set based on the IOHMODE returned from IOH_OPEN. The PDATA, REC and LEN parameters are used to move data in to the library to service the WRITE request.

2.2.2.3.2.6 IOH_FSYNC

The optional IOH_FSYNC entry point is required to service a POSIX_FSYNC or FSYNC request on the virtual file. The function is normally called to flush outstanding write requests. If FSYNC is requested for a virtual file, and the entry point has not been exported from the IOHANDLER, the program will simply receive a good result. If exported it must be compatible with the following procedure template.

REAL PROCEDURE IOH_FSYNC (F, IOH_DATA, VARIANT);
VALUE VARIANT;
FILE F;
ARRAY IOH_DATA [0:0];
REAL VARIANT;

Results:

The result returned as the procedure value is expected to be a value as defined in the File Attributes Programming Reference Manual, Appendix F: "I/O Result Enumerated Values". These values are supported by the compilers, such that the mnemonic values may be used. For example, the following statement would return the appropriate good result value for the FSYNC request:

IOH_FSYNC :=VALUE(NOERROR);
Parameters:
VARIANT

The VARIANT parameter corresponds to the POSIX_FSYNC variables defined as follows:

FSYNC_SV=1
FDSYNC_SV=2

2.2.2.3.2.7 IOH_ERASEFILE

The optional IOH_ERASEFILE entry point is required to service an ALGOL ERASE (or ERASEFILE) for the virtual file. If exported it must be compatible with the following procedure template.

REAL PROCEDURE IOH_ERASEFILE (F, IOH_DATA);
FILE F;
ARRAY IOH_DATA [0:0];

Results:

The result returned as the procedure value is expected to be a value as defined in the File Attributes Programming Reference Manual, Appendix F: "I/O Result Enumerated Values". These values are supported by the compilers, such that the mnemonic values may be used. For example, the following statement would return the appropriate good result value for the ERASE request:

IOH_ERASEFILE :=VALUE(NOERROR);

2.2.2.3.2.8 IOH_GETATTRIBUTE

The optional entry point IOH_GETATTRIBUTE is required to service file attribute interrogation for the attributes listed in the section entitled "Virtual File Attributes". If the entry point is not exported, an attribute error is returned to the program doing the interrogation. If exported, it must be declared to be compatible with the following procedure template.

REAL PROCEDURE IOH_GETATTRIBUTE (F, IOH_DATA, ATTNUM, ATTVALUE, ATTPOINTER);
  VALUE ATTNUM;
  FILE F;
  ARRAY IOH_DATA [0:0];
  REAL ATTNUM, ATTVALUE;
  POINTER ATTPOINTER;
Results:

The result returned as the procedure value is expected to be 0 for a good result. If a non-zero result is returned, the MCP will return a generic attribute error.

Parameters:

ATTNUM

The ATTNUM parameter is the attribute number used to select the attribute for interrogation. The attribute numbers are defined in the File Attributes Programming Reference Manual, and may be referred to in the program by mnemonic (e.g. VALUE(FILEKIND)).

ATTVAL

The ATTVAL parameter is used to return the non-pointer valued attributes.

ATTPOINTER

The ATTPOINTER parameter is the pointer to the array in which to return pointer valued attributes.

2.2.2.3.2.9 IOH_SETATTRIBUTE

The optional entry point IOH_SETATTRIBUTE is required to service file attribute modification for the attributes listed in the section entitled "Virtual File Attributes". If the entry point is not exported, an attribute error is returned to the program doing the modification. If exported, it must be declared to be compatible with the following procedure template.

REAL PROCEDURE IOH_SETATTRIBUTE (F, IOH_DATA, ATTNUM, ATTVALUE, ATTPOINTER);
  VALUE ATTNUM, ATTVALUE, ATTPOINTER;
  FILE F;
  ARRAY IOH_DATA [0:0];
  REAL ATTNUM, ATTVALUE;
  POINTER ATTPOINTER;
Results:

The result returned as the procedure value is expected to be 0 for a good result. If a non-zero result is returned, the MCP will return a generic attribute error.

Parameters:

ATTNUM

The ATTNUM parameter is the attribute number used to select the attribute for modification. The attribute numbers are defined in the File Attributes Programming Reference Manual, and may be referred to in the program by mnemonic (e.g. VALUE(FILEKIND)).

ATTVAL

The ATTVAL parameter is used to pass the value for setting the non-pointer valued attributes.

ATTPOINTER

The ATTPOINTER parameter is the pointer to the array holding the data with which to set the pointer valued attributes.

2.2.2.3.3 Example IOHANDLER

The following ALGOL program is an example IOHANDLER that uses much of the virtual file functionality. It acts as a surrogate disk file handler, using the entry parameter file F to create a disk file from a virtual file program. It corresponds to the DISKIOHANDLER function used in the example ALGOL COBOL85 programs.

```
$SET SHARING=SHAREDBYALL
BEGIN
 DEFINE
   INFO_ITEMP     (INFO,X) = POINTER(INFO[X(INFO)]) #
   ,INFO_WORDS    (INFO) = INFO [0].[47:24] #
   ,INFO_FIXED WORDS  (INFO) = INFO [0].[23:24] #
   ,INFO_VERSION  (INFO) = INFO [1].[07:08] #
     ,INFO_VERSIONV       = 1 #
   ,INFO_OPENATTRIBUTE (INFO) = INFO [2].[36:01] #
   ,INFO_OPENIMPLICIT (INFO) = INFO [2].[32:01] #
   ,INFO_OPENTYPE  (INFO) = INFO [2].[31:08] #
     ,OPENWAITV           = 1 #
     ,AVAILABLEV          = 2 #
     ,OFFERV         = 3 #
     ,RESIDENTV           = 4 #
     ,PRESENTV            = 5 #
     ,PBTREELSWITCHOPENV     = 6 #
     ,STKASSIGNEDOPENREVERSEV  = 7 #
     ,F77BACKSPACEV       = 8 #
     ,UNCONDITIONALV      = 9 # % EVEN IF EXCLUSIVE
     ,SERVERREOPENV       = 10 #
     ,CONDITIONALV        = 11 # % POSIX OPEN COND'L
     ,MUSTBENEWV          = 12 # % POSIX OPEN
     MUSTBENEW
   ,INFO_NEWFILE   (INFO) = INFO [2].[23:01] #
   ,INFO_EXCLUSIVE  (INFO) = INFO [2].[22:01] #
   ,INFO_FILEUSE   (INFO) = INFO [2].[21:02] #
   ,INFO_DEPENDENTINTMODE(INFO) = INFO [2].[16:01] #
   ,INFO_DEPENDENTSPECS (INFO) = INFO [2].[12:01] #
   ,INFO_SYNCHRONIZE  (INFO) = INFO [2].[09:02] #
   ,INFO_FILEKIND   (INFO) = INFO [2].[07:08] #
   ,INFO_FILEORGANIZATION(INFO) = INFO [3].[43:04] #
   ,INFO_FILESTRUCTURE (INFO) = INFO [3].[39:08] #
   ,INFO_BLOCKSTRUCTURE (INFO) = INFO [3].[31:04] #
   ,INFO_EXTMODEBITS  (INFO) = INFO [3].[27:08] #
   ,INFO_OVERRIDEEXTMODE (INFO) = INFO [3].[19:04] #
   ,INFO_EXTMODE    (INFO) = INFO [3].[15:16] #
   ,INFO_INTMODE    (INFO) = INFO [4].[47:16] #
   ,INFO_CCSVERSION   (INFO) = INFO [4].[31:16] #
   ,INFO_EXTDELIMITER (INFO) = INFO [4].[15:08] #
   ,INFO_FRAMESIZE   (INFO) = INFO [4].[07:08] #
   ,INFO_BLOCKSIZE   (INFO) = INFO [5].[47:16] #
   ,INFO_MINRECSIZE   (INFO) = INFO [5].[31:16] #
   ,INFO_MAXRECSIZE   (INFO) = INFO [5].[15:16] #
   ,INFO_ANYSIZEIO   (INFO) = INFO [6].[44:01] #
   ,INFO_ADAPTABLE   (INFO) = INFO [6].[40:01] #
   ,INFO_UNITS    (INFO) = INFO [6].[36:01] #
   ,INFO_BUFFERSHARING (INFO) = INFO [6].[33:02] #
   ,INFO_BUFFERS    (INFO) = INFO [6].[31:08] #
   ,INFO_BUFFERSIZE   (INFO) = INFO [6].[23:24] #
   ,INFO_AREAS    (INFO) = INFO [7].[47:16] #
   ,INFO_AREALENGTH   (INFO) = INFO [7].[31:32] #
   ,INFO_AREASIZE   (INFO) = INFO [8].[47:24] #
   ,INFO_SECURITYTYPE  (INFO) = INFO [8].[23:04] #
   ,INFO_SECURITYUSE  (INFO) = INFO [8].[19:04] #
   ,INFO_SECURITYMODE  (INFO) = INFO [8].[15:16] #
   ,INFO_FILESNR   (INFO) = INFO [9] #
   ,INFO_FILEMIX   (INFO) = INFO [10] #
   % Variable Length Attributes
   ,INFO_ATT_LINKF = [47:24] #
   ,INFO_ATT_LENF  = [23:24] #
   ,INFO_FILENAMEINX (INFO) = INFO
   [11].INFO_ATT_LINKF #
   ,INFO_FILENAMECHRS (INFO) = INFO
   [11].INFO_ATT_LENF #
   ,INFO_FAMILYNAMEINX (INFO) = INFO
   [12].INFO_ATT_LINKF #
   ,INFO_FAMILYNAMECHRS (INFO) = INFO
   [12].INFO_ATT_LENF #
   ,INFO_STRINGINX   (INFO) = INFO
   [13].INFO_ATT_LINKF #
   ,INFO_STRINGCHRS   (INFO) = INFO
   [13].INFO_ATT_LENF #
   ,INFO_FILEUCINX    (INFO) = INFO [14].INFO_ATT_LINKF #
   ,INFO_FILEUCCHRS   (INFO) = INFO
   [14].INFO_ATT_LENF #
   ,INFO_NOTEINX    (INFO) = INFO [15].INFO_ATT_LINKF #
   ,INFO_NOTECHRS    (INFO) = INFO [15].INFO_ATT_LENF #
   ,INFO_GUARDFILEINX  (INFO) = INFO
```

-continued

```
    [16].INFO_ATT_LINKF #
,INFO_GUARDFILECHRS (INFO) = INFO
    [16].INFO_ATT_LENF #
,INFO_GROUPINX    (INFO) = INFO [17].INFO_ATT_LINKF #
,INFO_GROUPCHRS   (INFO) = INFO
    [17].INFO_ATT_LENF #
,INFO_ALTGROUPSINX  (INFO) = INFO
    [18].INFO_ATT_LINKF #
,INFO_ALTGROUPSCHRS (INFO) = INFO
    [18].INFO_ATT_LENF #
,INFO_OWNERINX    (INFO) = INFO [19].INFO_ATT_LINKF #
,INFO_OWNERCHRS   (INFO) = INFO
    [19].INFO_ATT_LENF #
,INFO_INTNAMEINX    (INFO) = INFO
    [20].INFO_ATT_LINKF #
,INFO_INTNAMECHRS   (INFO) = INFO
    [20].INFO_ATT_LENF #
,INFO_HOSTNAMEINX   (INFO) = INFO
    [21].INFO_ATT_LINKF #
,INFO_HOSTNAMECHRS  (INFO) = INFO
    [21].INFO_ATT_LENF #
,INFO_FIRSTINFO      = 20 #
,INFO_STRINGP(INFO) =
INFO_TEMP(INFO,INFO_STRINGINX) #
,INFO_FILENAMEP(INFO) =
INFO_ITEMP(INFO,INFO_FILENAMEINX) #
,INFO_FAMILYNAMEP(INFO)=
INFO_ITEMP(INFO,INFO_FAMILYNAMEINX)#
    ,INFO_FILEUCP(INFO)   = INFO
    ITEMP(INFO,INFO_FILEUCINX) #
    ,INFO_NOTEP(INFO)    = INFO_ITEMP(INFO
    INFO_NOTEINX) #
    ,INFO_GROUPP (INFO)   =
    INFO_ITEMP(INFO,INFO_GROUPINX) #
    ,INFO_ALTGROUPSP(INFO) = INFO_ITEMP(INFO,
    INFO_ALTGROUPSINX)#
    ,INFO_GUARDFILEP(INFO) = INFO_ITEMP(INFO,
    INFO_GUARDFILEINX)#
    ,INFO_INTNAMEP (INFO) = INFO_ITEMP(INFO,
    INFO_INTNAMEINX) #
    ,INFO_HOSTNAMEP (INFO) = INFO_ITEMP(INFO,
    INFO_HOSTNAMEINX) #
    ;
    DEFINE FILE_RECSIZE  = IOHSTATE [0] #,
        FILE_CHARSIZE = IOHSTATE [1] #,
        FILE_FRAMESIZE = IOHSTATE [2] #,
        FILE_UNITS    = IOHSTATE [3] #,
        IOH_STATE_WORDS= 4 #;
    DEFINE BITSPERBYTE = 8 #,
        BITSPERWORD = 48 #,
        BITSPERUNIT(M) =
        (IF M > 6 THEN
            IF M=VALUE(UCS2NT) THEN 16
                ELSE 8
            ELSE
            (0 & 48 [ 0:6]      % CASE (M) OF (48
            & 48 [ 6:6]   %   ,48
            & 4 [12:6]    %   ,4
            & 6 [18:6]    %   ,6
            & 8 [24:6]    %   ,8
            & 8 [30:6]    %   ,8
            & 0 [36:6]).[(M)*6:6])#;%   ,0)
DEFINE COVQ (V, D) = (((V) + (D) – 1) DIV (D)) #,
    COVER (V, D) = ((D) * (COVQ((V), (D)))) #;
REAL PROCEDURE IOH_OPEN (F,IOHDATA,IOHINFO,RECSIZE,
            MODE,MAXXMT,ACCESS,BLOCKSTRUCT);
    FILEF;
    ARRAY IOHDATA [0,0], IOHINFO [0];
    REAL RECSIZE,MODE,MAXXMT,ACCESS,BLOCKSTRUCT;
BEGIN
    REAL OPENRSLT,
        FILE_USE;
    BOOLEAN CREATEFILE,
        DEPENDENT_SPECS;
    ARRAY REFERENCE
        IOHSTATE [0];
    ON ANYFAULT, PROGRAMDUMP(ALL,TODISK);
    IOHSTATE := IOHDATA [0,*];
    IF SIZE(IOHSTATE) < IOH_STATE_WORDS THEN
        RESIZE(1OHSTATE,IOH_STATE_WORDS);
    CREATEFILE   := BOOLEAN(INFO_NEWFILE(IOHINFO));
    DEPENDENT_SPECS :=
BOOLEAN(INFO_DEPENDENTSPECS(IOHINFO));
    IF INFO_FILENAMECHRS(IOHINFO) > 0 THEN
        REPLACE F.LFILENAME BY INFO_FILENAMEP(IOHINFO);
    IF INFO_FAMILYNAMECHRS(IOHINFO) > 0 THEN
        REPLACE F.FAMILYNAME BY
    INFO_FAMILYNAMEP(IOHINFO);
    IF INFO_HOSTNAMECHRS(IOHINFO) > 0 THEN
        REPLACE F.HOSTNAME BY INFO_HOSTNAMEP(IOHINFO);
    IF INFO_BUFFERS(IOHINFO) > 0 THEN
        F.BUFFERS := INFO_BUFFERS(IOHINFO);
    IF INFO_BUFFERSIZE(IOHINFO) > 0 THEN
        F.BUFFERSIZE := INFO_BUFFERSIZE(IOHINFO);
    IF INFO_BUFFERSHARING(IOHINFO) NEQ
VALUE(NONE) THEN
        F.BUFFERSHAIUNG := INFO_BUFFERSHARING(IOHINFO);
    F (KIND     = DISK
    ,NEWFILE    = CREATEFILE
    ,FILEUSE    = INFO_FILEUSE(IOHINFO)
    ,EXCLUSIVE   = BOOLEAN(INFO_EXCLUSIVE(IOHINFO))
    ,ANYSIZEIO   = BOOLEAN(INFO_ANYSIZEIO(IOHINFO))
    ,SYNCHRONIZE  = INFO_SYNCHRONIZE(IOHINFO)
    ,ADAPTABLE   =
BOOLEAN(INFO_ADAPTABLE(IOHINFO))
    ,DEPENDENTSPECS = DEPENDENT_SPECS
    ,DEPENDENTINTMODE = TRUE % Translation already done.
    );
    IF CREATEFILE OR NOT DEPENDENT_SPECS THEN
    BEGIN
        FILE_CHARSIZE := INFO_EXTMODEBITS(IOHINFO);
        FILE_UNITS   := IF INFO_FRAMESIZE(IOHINFO) = 0
        THEN
            INFO_UNITS(IOHINFO)
            ELSE
            IF INFO_FRAMESIZE(IOHINFO) = 48 THEN
            VALUE(WORDS)
            ELSE
            VALUE(CHARACTERS);
        FILE_FRAMESIZE := IF FILE UNITS = VALUE(WORDS)
        THEN 48
            ELSE FILE_CHARSIZE;
        IF FILE_UNITS = VALUE(WORDS) THEN % convert to
        words
        RECSIZE := RECSIZE DIV
            (BITSPERWORD DIV FILE_CHARSIZE);
    F (MAXRECSIZE   = RECSIZE
    ,FRAMESIZE    = FILE_FRAMESIZE
    ,INTMODE     = MODE
    ,EXTMODE     = MODE
    ,BLOCKSTRUCTURE = BLOCKSTRUCT
    ,FILEKIND     = INFO_FILEKIND(IOHINFO)
    ,FILESTRUCTURE = INFO_FILESTRUCTURE(IOHINFO)
    ,FILEORGANIZATION = INFO_FILEORGANIZATION
    (IOHINFO)
    ,SECURITYMODE   = INFO_SECURITYMODE
    (IOHINFO)
    );
    IF INFO_FILESTRUCTURE(IOHINFO) NEQ VALUE
    (STREAM) AND
        INFO_BLOCKSIZE(IOHINFO) > 0 THEN
        F.BLOCKSIZE := INFO_BLOCKSIZE(IOHINFO);
    IF INFO_AREAS(IOHINFO) > 0 THEN
        F.AREAS := INFO_AREAS(IOHINFO);
    IF INFO_AREASIZE(IOHINFO) > 0 THEN
        F.AREASIZE := INFO_AREASIZE(IOHINFO);
    IF INFO_AREALENGTH(IOHINFO) > 0 THEN
        F.AREALENGTH := INFO_AREALENGTH(IOHINFO);
    IF INFO_NOTECHRS(IOHINFO) > 0 THEN
        REPLACE F.NOTE BY INFO_NOTEP(IOHINFO);
    IF INFO_STRINGCHRS(IOHINFO) > 0 THEN
        REPLACE F.IOHSTRING BY INFO_STRINGP(IOHINFO);
    IF INFO_GROUPCHRS(IOHINFO) > 0 THEN
        REPLACE F.GROUP BY INFO_GROUPP(IOHINFO);
    IF INFO_ALTGROUPSCHRS(IOHINFO) > 0 THEN
        REPLACE F.ALTERNATEGROUPS BY
    INFO_ALTGROUPSP(IOHINFO);
    IF INFO_SECURITYTYPE(IOHINFO) =
```

```
         VALUE(GUARDED) AND INFO_GUARDFILECHRS
         (IOHINFO) > 0 THEN REPLACE F.SECURITYGUARD BY
         INFO_GUARDFILEP(IOHINFO);
      END;
   OPENRSLT := IF INFO_OPENTYPE(IOHINFO) = RESIDENTV
   THEN
            IF F.RESIDENT THEN VALUE(OKRSLT)
                  ELSE VALUE(NOFILEFOUNDRSLT)
            ELSE
            F.AVAILABLE;
   IF OPENRSLT = VALUE(OKRSLT) THEN
      IF INFO_OPENTYPE(IOHINFO) NEQ RESIDENTV OR
         (NOT CREATEFILE AND INFO_DEPENDENTSPECS
         (IOHINFO)=1)THEN
      BEGIN
      FILE_RECSIZE := F.MAXRECSIZE;
      FILE_FRAMESIZE := F.FRAMESIZE;
      FILE_UNITS   := F.UNITS;
      MODE       := F.INTMODE;
      FILE_CHARSIZE := BITSPERUNIT(MODE);
      % Return the RECSIZE in MODE Character Size.
      RECSIZE := FILE_RECSIZE*FILE_FRAMESIZE DIV
            FILE_CHARSIZE;
      MAXXMT := IF BOOLEAN(INFO_ANYSIZEIO(IOHINFO))
         THEN
            IF INFO_BUFFERSIZE(IOHINFO) > 0 THEN
            INFO_BUFFERSIZE(IOHINFO)
            ELSE
               65535
            ELSE
            RECSIZE;
      MAXXMT := MAX (1, MAXXMT DIV RECSIZE);% in
      records
      FILE_USE := F.FILEUSE;
      ACCESS := 0 & REAL(FILE_USE NEQ VALUE(OUT)) [2:1]
            & REAL(FILE_USE NEQ VALUE(IN)) [1:1];
      BLOCKSTRUCT := F.BLOCKSTRUCTURE;
      END;
   IOH_OPEN := OPENRSLT;
END IOH_OPEN;
REAL PROCEDURE IOH_CLOSE (F, IOHDATA, ASSOCIATION,
DISPOSITION); VALUE ASSOCIATION, DISPOSITION;
FILE F;
ARRAY IOHDATA [0,0];
REAL ASSOCIATION, DISPOSITION;
BEGIN
DEFINE
 % ASSOCIATION
  RELEASEV = 1 #
  ,RETANV = 2 #
  ,RESERVEV = 3 #
  ,DISABLEV = 4 #
 % DISPOSITION
  ,REWINDV   = 1 #
  ,NOREWINDV = 2 #
  ,SAVEV   =3 #
  ,LOCKV   =4 #
  ,PURGEV   = 5 #
  ,CRUNCHV  = 6 #
  ,HEREV   = 7 # % (ASSOCIATION MUST BE RETAINV)
  ,BLOCKEXITV = 8 #
  ,ABORTV  =9 #
  ,ORDERLYV = 10 #
  ,DOWNSIZEAREAV = 11 #
  ,DOWNSIZEAREALOCKV = 12 #
  ;
ON ANYFAULT, PROGRAMDUMP(ALL,TODISK);
IF NOT F.OPEN THEN
 IOH_CLOSE := VALUE(OKRSLT)
ELSE
 CASE DISPOSITION.[3:4] OF
   BEGIN
      REWINDV:
         IOH_CLOSE := CLOSE (F,REWIND);
      LOCKV :
      SAVEV :
         IOH_CLOSE := CLOSE (F,LOCK);
      CRUNCHV:
         IOH_CLOSE := CLOSE (F,CRUNCH);
      PURGEV:
         IOH_CLOSE := CLOSE (F,PURGE);
      DOWNSIZEAREAV:
         IOH_CLOSE := CLOSE (F,DOWNSIZEAREA);
      DOWNSIZEAREALOCKV:
         IOH_CLOSE := CLOSE (F,DOWNSIZEAREALOCK);
      ELSE:
         IOH_CLOSE := CLOSE (F);
   END;
 END IOH_CLOSE;
REAL PROCEDURE IOH_READ (F, IOHDATA, FEATUREMASK,
REC, LEN, PDATA);
 VALUE FEATUREMASK, REC, PDATA;
 FILE F;
 ARRAY IOHDATA [0,0];
 REAL FEATUREMASK, REC, LEN;
 POINTER PDATA;
 BEGIN
 REAL RD;
 BOOLEAN BRD = RD;
 ARRAY REFERENCE IOHSTATE [0];
 ON ANYFAULT, PROGRAMDUMP(ALL,TODISK);
 IOHSTATE := IOHDATA [0,*];
 BRD := READ (F [REC],
         LEN*FILE_CHARSIZE DIV FILE_FRAMESIZE, PDATA);
 LEN := RD.[47:20]*FILE_FRAMESIZE DIV FILE_CHARSIZE;
 IOH_READ := IF BRD THEN RD.[26:10] ELSE VALUE(NOERROR);
 END IOH_READ;
REAL PROCEDURE IOH_WRITE (F, IOHDATA, FEATUREMASK,
REC, LEN, PDATA);
 VALUE FEATUREMASK, REC, PDATA;
 FILE F;
 ARRAY IOHDATA [0,0];
 REAL FEATUREMASK, REC, LEN;
 POINTER PDATA;
 BEGIN
 REAL RD;
 BOOLEAN BRD = RD;
 ARRAY REFERENCE IOHSTATE [0];
 ON ANYFAULT, PROGRAMDUMP(ALL,TODISK);
 IOHSTATE := IOHDATA [0,*];
 BRD := IF BOOLEAN(FEATUREMASK) THEN
         WRITE (F [REC],
            LEN*FILE_CHARSIZE DIV FILE_FRAMESIZE,
            PDATA)
         ELSE
         WRITE (F [REC],
            LEN*FILE_CHARSIZE DIV FILE_FRAMESIZE,
            PDATA);
 LEN := RD.[47:20]*FILE_FRAMESIZE DIV FILE_CHARSIZE;
 IOH_WRITE := IF BRD THEN RD.[26:10] ELSE VALUE
 (NOERROR);
 ENDIOH_WRITE;
LIBRARY MCPSUPPORT (LIBACCESS=BYFUNCTION);
BOOLEAN PROCEDURE FILESYNC(F,FORCEHEADERWRITE);
 VALUE FORCEHEADERWRITE;
 FILE F;
 BOOLEAN FORCEHEADERWRITE;
 LIBRARY MCPSUPPORT;
REAL PROCEDURE IOH_FSYNC (F, IOHDATA, VARIANT);
 VALUE VARIANT;
 FILE F;
 ARRAY IOHDATA [0,0];
 REAL VARIANT;
BEGIN
 BOOLEAN FSYNC;
 FSYNC := FILESYNC (F, BOOLEAN(VARIANT));
   IOH_FSYNC := REAL(FSYNC).[26:10];
 ENDIOH_FSYNC;
REAL PROCEDURE IOH_ERASEFILE (F, IOHDATA);
 FILE F;
 ARRAY IOHDATA [0,0];
 BEGIN
  IOH_ERASEFILE := REAL(ERASE (F));
  END IOH_ERASEFILE;
REAL PROCEDURE IOH_GETATTRIBUTE (F, IOHDATA,
ATTNUM, ATTVAL, ATTPTR);
 VALUE ATTNUM;
 FILE F;
```

```
ARRAY IOHDATA [0,0];
REAL ATTNUM, ATTVAL;
POINTER ATTPTR;
BEGIN
  BOOLEAN BATTVAL = ATTVAL;
    ON ANYFAULT, PROGRAMDUMP(ALL,TODISK);
    CASE ATTNUM OF
    BEGIN
    VALUE(ACCESSDATE):
        ATTVAL := F.ACCESSDATE;
    VALUE(ACCESSTIME):
        ATTVAL := F.ACCESSTIME;
    VALUE(ALTERDATE):
        ATTVAL := F.ALTERDATE;
    VALUE(ALTERTIME):
        ATTVAL := F.ALTERTIME;
    VALUE(CREATIONDATE):
        ATTVAL := F.CREATIONDATE;
    VALUE(CREATIONTIME):
        ATTVAL := F.CREATIONTIME;
    VALUE(SYNCHRONIZE):
        ATTVAL := F.SYNCHRONIZE;
    VALUE(SECURITYTYPE):
        ATTVAL := F.SECURITYTYPE;
    VALUE(SECURITYUSE):
        ATTVAL := F.SECURITYUSE;
    VALUE(SECURITYMODE):
        ATTVAL := F.SECURITYMODE;
    VALUE(OWNERRWX):
        ATTVAL := F.OWNERRWX;
    VALUE(GROUPRWX):
        ATTVAL := F.GROUPRWX;
    VALUE(OTHERRWX):
        ATTVAL := F.OTHERRWX;
    VALUE(OWNERR):
        BATTVAL := F.OWNERR;
    VALUE(OWNERW):
        BATTVAL := F.OWNERW;
    VALUE(OWNERX):
        BATTVAL := F.OWNERX;
    VALUE(GROUPR):
        BATTVAL := F.GROUPR;
    VALUE(GROUPW):
        BATTVAL := F.GROUPW;
    VALUE(GROUPX):
        BATTVAL := F.GROUPX;
    VALUE(OTHERR):
        BATTVAL := F.OTHERR;
    VALUE(OTHERW):
        BATTVAL := F.OTHERW;
    VALUE(OTHERX):
        BATTVAL := F.OTHERX;
    VALUE(USEGUARDFILE):
        BATTVAL := F.USEGUARDFILE;
    VALUE(GUARDOWNER):
        BATTVAL := F.GUARDOWNER;
    VALUE(SETUSERCODE):
        BATTVAL := F.SETUSERCODE;
    VALUE(SETGROUPCODE):
        BATTVAL := F.SETGROUPCODE;
    VALUE(GROUP):
        REPLACE ATTPTR:ATTPTR BY F.GROUP;
    VALUE(OWNER):
        REPLACE ATTPTR:ATTPTR BY F.OWNER;
    VALUE(ALTERNATEGROUPS):
        REPLACE ATTPTR:ATTPTR BY F.ALTERNATEGROUPS;
    VALUE(IOHSTRING):
        REPLACE ATTPTR:ATTPTR BY F.IOHSTRING;
    VALUE(NOTE):
        REPLACE ATTPTR:ATTPTR BY F.NOTE;
    VALUE(FILELENGTH):
        ATTVAL := F.FILELENGTH;
    VALUE(LASTRECORD):
        ATTVAL := F.LASTRECORD;
    VALUE(CCSVERSION):
        ATTVAL := F.CCSVERSION;
    VALUE(EXTDELIMITER):
        ATTVAL := F.EXTDELIMITER;
    VALUE(FILEKIND):
        ATTVAL := F.FILEKIND;
    VALUE(USERINFO):
        ATTVAL := F.USERINFO;
    ELSE:
        IOH_GETATTRIBUTE := 1;
    END;
  END IOH_GETATTRIBUTE;
  REAL PROCEDURE IOH_SETATTRIBUTE (F, IOHDATA,
    ATTNUM, ATTVAL, ATTPTR);
    VALUE ATTNUM, ATTVAL, ATTPTR;
    FILE F;
    ARRAY IOHDATA [0,0];
    REAL ATTNUM, ATTVAL;
    POINTER ATTPTR;
BEGIN
  POINTER P;
  BOOLEAN BATTVAL = ATTVAL;
    ON ANYFAULT, PROGRAMDUMP(ALL,TODISK);
    CASE ATTNUM OF
    BEGIN
    VALUE(SYNCHRONIZE):
        F.SYNCHRONIZE := ATTVAL;
    VALUE(SECURITYTYPE):
        F.SECURITYTYPE := ATTVAL;
    VALUE(SECURITYUSE):
        F.SECURITYUSE := ATTVAL;
    VALUE(SECURITYMODE):
        F.SECURITYMODE := ATTVAL;
    VALUE(OWNERRWX):
        F.OWNERRWX := ATTVAL;
    VALUE(GROUPRWX):
        F.GROUPRWX := ATTVAL;
    VALUE(OTHERRWX):
        F.OTHERRWX := ATTVAL;
    VALUE(OWNERR):
        F.OWNERR := BATTVAL;
    VALUE(OWNERW):
        F.OWNERW := BATTVAL;
    VALUE(OWNERX):
        F.OWNERX := BATTVAL;
    VALUE(GROUPR):
        F.GROUPR := BATTVAL;
    VALUE(GROUPW):
        F.GROUPW := BATTVAL;
    VALUE(GROUPX):
        F.GROUPX := BATTVAL;
    VALUE(OTHERR):
        F.OTHERR := BATFVAL;
    VALUE(OTHERW):
        F.OTHERW := BATTVAL;
    VALUE(OTHERX):
        F.OTHERX := BATTVAL;
    VALUE(GROUP):
        REPLACE F.GROUP BY ATTPTR;
    VALUE(OWNER):
        REPLACE F.OWNER BY ATTPTR;
    VALUE(ALTERNATEGROUPS):
        REPLACE F.ALTERNATEGROUPS BY ATTPTR;
    VALUE(TITLE):
        REPLACE F.TITLE BY ATTPTR;
    VALUE(LTITLE):
        REPLACE F.LTITLE BY ATTPTR;
    VALUE(FILENAME):
        REPLACE F.FILENAME BY ATTPTR;
    VALUE(LFILENAME):
        REPLACE F.LFILENAME BY ATTPTR;
    VALUE(IOHSTRING):
        REPLACE F.IOHSTRING BY ATTPTR;
    VALUE(NOTE):
        REPLACE F.NOTE BY ATTPTR;
    VALUE(CCSVERSION):
        F.CCSVERSION := ATTVAL;
    VALUE(EXTDELIMITER):
        F.EXTDELIMITER := ATTVAL;
    VALUE(FILEKIND):
        F.FILEKIND := ATTVAL;
    VALUE(USERINFO):
        F.USERINFO := ATTVAL;
    ELSE:
```

```
    ;
  END;
END IOH_SETATTRIBUTE;
EXPORT
   IOH_OPEN
   ,IOH_CLOSE
   ,IOH_READ
   ,IOH_WRITE
   ,IOH_FSYNC
   ,IOH_ERASEFILE
   ,IOH_GETATTRIBUTE
   ,IOH_SETATTRIBUTE
   ;
FREEZE (PERMANENT);
END.
```

End of Documentation

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It is appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. Thus the scope of the invention should be determined by the appended claims and their legal equivalents, rather than by the examples given.

What is claimed is:

1. In a data processing system having a native operating system including a logical I/O subsystem which interacts with one or more files of an application program, a method comprising:
   the application program requesting by a predesignated operating system method to perform one or more operations on a file;
   creating a data structure when the predesignated operating system method is indicated which allows logical I/O routines to communicate with a handler, wherein the handler comprises a library, and wherein the handler is external to a native operating system kernel but within the data processing system;
   the handler performing the one or more operations on the file;
   the data structure returning completed operation results from the handler to the application program, and returning control of file operations to the application program; and
   building a file information block when the application program opens a specified file, the file information block including attributes of the specified file, wherein the data structure is part of the file information block, and wherein the completed operation results from the handler are returned to the file information block.

2. The method of claim 1 wherein the files include data and the library performs a data processing function on the data.

3. The method of claim 1 wherein the file requires data from a resource type and the library performs a data retrieval function to obtain the required data.

4. The method of claim 1 wherein the predesignated operating system method is indicated by invoking a predesignated attribute specification.

5. The method of claim 4 wherein the predesignated attribute specification is KIND=VIRTUAL.

6. The method of claim 1 wherein the operation results include file attribute information, file data, and the result of the operation, the result indicating success or failure of the operation or the number of bytes transferred.

7. The method of claim 1 wherein the handler accesses one or more resource types which are not supported by the native operating system.

8. The method of claim 1 wherein the logical I/O subsystem interacts with the application program files using native logical I/O requests, and the handler receives from the data structure and understands and executes the same native logical I/O requests as the native operating system, while remaining external to the native operating system kernel.

9. An article of manufacture for use in a data processing system having a native operating system including a logical I/O subsystem which interacts with one or more files of an application program, the article of manufacture comprising a computer-readable medium holding computer-executable instructions for performing a method comprising:
   providing a predesignated operating system method by which an application program can request to perform one or more operations on a file;
   creating a data structure when the predesignated operating system method is indicated which allows logical I/O routines to communicate with a handler, wherein the handler comprises a library, and wherein the handler is external to a native operating system kernel but within the data processing system; and
   building a file information block when the application program opens a specified file, the file information block including attributes of the specified file, wherein the data structure is part of the file information block, and wherein the completed operation results from the handler are returned to the file information block.

10. The article of manufacture of claim 9 wherein the files include data and the library performs a data processing function on the data.

11. The article of manufacture of claim 9 wherein the file requires data from a resource type and the library performs a data retrieval function to obtain the required data.

12. The article of manufacture of claim 9 wherein the predesignated operating system method is indicated by invoking a predesignated attribute specification.

13. The article of manufacture of claim 12 wherein the predesignated attribute specification is KIND=VIRTUAL.

14. The article of manufacture of claim 9 wherein the operation results include file attribute information, file data, and the result of the operation, the result indicating success or failure of the operation or the number of bytes transferred.

15. The article of manufacture of claim 9 wherein the handler accesses one or more resource types which are not supported by the native operating system.

16. The article of manufacture of claim 9 wherein the logical I/O subsystem interacts with the application program files using native logical I/O requests, and the handler receives from the data structure and understands and executes the same native logical I/O requests as the native operating system, while remaining external to the native operating system kernel.

17. In a data processing system having a native operating system including a logical I/O subsystem which interacts with one or more files of an application program, a file processing system comprising:

the application program requesting by a predesignated operating system method to perform one or more operations on a file;

a handler, wherein the handler comprises a library, and which is external to a native operating system kernel but within the data processing system, wherein the data structure allows logical I/O routines to communicate with the handler, the handler performing the one or more operations on the file, the data structure returning completed operation results from the handler to the application program, and returning control of file operations to the application program; and a file information block which is built when the application program opens a specified file, the file information block including attributes of the specified file, wherein the data structure is part of the file information block, wherein the completed operation results from the handler are returned to the file information block.

18. The system of claim 17 wherein the files include data and the library performs a data processing function on the data.

19. The system of claim 17 wherein the file requires data from a resource type and the library performs a data retrieval function to obtain the required data.

20. The system of claim 17 wherein the application program indicates that it wants to perform one or more operations on an application program file in an environment external to the native operating system kernel by invoking a predesignated attribute specification.

21. The system of claim 20 wherein the predesignated attribute specification is KIND=VIRTUAL.

22. The system of claim 17 wherein the operation results include file attribute information, file data, and the result of the operation, the result indicating success or failure of the operation or the number of bytes transferred.

23. The system of claim 17 wherein the handler accesses one or more resource types which are not supported by the native operating system.

24. The system of claim 17 wherein the logical I/O subsystem interacts with the application program files using native logical I/O requests, and the handler receives from the data structure and understands and executes the same native logical I/O requests as the native operating system, while remaining external to the native operating system kernel.

* * * * *